US012671804B2

(12) United States Patent
Pan et al.

(10) Patent No.: US 12,671,804 B2
(45) Date of Patent: Jun. 30, 2026

(54) ENCODING AND DECODING METHOD, APPARATUS, AND DEVICE

(71) Applicant: HANGZHOU HIKVISION DIGITAL TECHNOLOGY CO., LTD., Hangzhou (CN)

(72) Inventors: Dongping Pan, Hangzhou (CN); Xiaoyang Wu, Hangzhou (CN); Yucheng Sun, Hangzhou (CN); Fangdong Chen, Hangzhou (CN)

(73) Assignee: HANGZHOU HIKVISION DIGITAL TECHNOLOGY CO., LTD., Hangzhou (CN)

( * ) Notice: Subject to any disclaimer, the term of this patent is extended or adjusted under 35 U.S.C. 154(b) by 0 days.

(21) Appl. No.: 18/998,220

(22) PCT Filed: Jul. 25, 2023

(86) PCT No.: PCT/CN2023/109174
§ 371 (c)(1),
(2) Date: Jan. 24, 2025

(87) PCT Pub. No.: WO2024/022356
PCT Pub. Date: Feb. 1, 2024

(65) Prior Publication Data
US 2026/0039787 A1 Feb. 5, 2026

(30) Foreign Application Priority Data
Jul. 26, 2022 (CN) .......................... 202210887893.0

(51) Int. Cl.
*H04N 7/12* (2006.01)
*H04N 19/105* (2014.01)
(Continued)

(52) U.S. Cl.
CPC ......... *H04N 19/105* (2014.11); *H04N 19/176* (2014.11); *H04N 19/182* (2014.11)

(58) Field of Classification Search
CPC .................................................... H04N 19/105
See application file for complete search history.

(56) References Cited

U.S. PATENT DOCUMENTS

2016/0105682 A1 4/2016 Rapaka et al.
2016/0337661 A1 11/2016 Pang et al.
(Continued)

FOREIGN PATENT DOCUMENTS

CN 103581647 A 2/2014
CN 103782598 A 5/2014
(Continued)

OTHER PUBLICATIONS

Naser et al., "EE2: Intra Template Matching," Joint Video Experts Team (JVET) of ITU-T SG 16 WP 3 and ISO/IEC JTC 1/SC 29, JVET-V0130-v6, InterDigital, Apr. 20-28, 2021, 7 pages.
(Continued)

*Primary Examiner* — Y Lee
(74) *Attorney, Agent, or Firm* — Fish & Richardson P.C.

(57) ABSTRACT

The present invention provides an encoding and decoding method, apparatus and device. The method comprises: when a reference pixel of a current block is not available, removing a target prediction mode from an initial prediction mode list corresponding to the current block, so as to obtain a target prediction mode list; and encoding and decoding the current block on the basis of the target prediction mode list. The present invention can improve the encoding performance and the decoding performance.

13 Claims, 7 Drawing Sheets

(51) Int. Cl.
  *H04N 19/176* (2014.01)
  *H04N 19/182* (2014.01)

(56) References Cited

U.S. PATENT DOCUMENTS

| | | | |
|---|---|---|---|
| 2017/0099495 A1 | 4/2017 | Rapaka et al. | |
| 2017/0134726 A1 | 5/2017 | Gyu et al. | |
| 2018/0152727 A1 | 5/2018 | Chuang et al. | |
| 2019/0007693 A1 | 1/2019 | Wang et al. | |
| 2020/0099953 A1 | 3/2020 | Xu et al. | |
| 2020/0128265 A1 | 4/2020 | Xiaozhong et al. | |
| 2020/0280742 A1 | 9/2020 | Krishnan et al. | |
| 2020/0296367 A1 | 9/2020 | Pham Van et al. | |
| 2021/0195227 A1 | 6/2021 | Hyun et al. | |
| 2021/0203957 A1 | 7/2021 | Zhou et al. | |
| 2021/0235102 A1 | 7/2021 | Xu et al. | |
| 2022/0086447 A1 | 3/2022 | Jizheng et al. | |
| 2022/0191531 A1 | 6/2022 | Sim et al. | |
| 2023/0209051 A1* | 6/2023 | Pan | H04N 19/182 375/240.02 |
| 2024/0146916 A1* | 5/2024 | Pan | H04N 19/80 |
| 2025/0142067 A1* | 5/2025 | Wei | H04N 19/40 |

FOREIGN PATENT DOCUMENTS

| | | |
|---|---|---|
| CN | 105516726 A | 4/2016 |
| CN | 110290388 A | 9/2019 |
| CN | 111149362 A | 5/2020 |
| CN | 113196775 A | 7/2021 |
| CN | 116095311 A | 5/2023 |
| JP | 2015005903 A | 1/2015 |
| WO | WO 2020060820 A1 | 3/2020 |
| WO | WO 2020177661 A1 | 9/2020 |
| WO | WO 2020233600 A1 | 11/2020 |
| WO | WO 2022207400 A1 | 10/2022 |

OTHER PUBLICATIONS

Naser et al., "Evaluation of Template Matching Prediction for VVC," Joint Video Experts Team (JVET) of ITU-T SG 16 WP 3 and ISO/IEC JTC 1/SC 29, JVET-U0048, InterDigital, Jan. 6-15, 2021, 6 pages.

Office Action in Japanese Appln. No. 2025-504365, mailed on Dec. 9, 2025, 11 pages (with English translation).

Partial Supplementary European Search Report in European Appln. No. 23845565.3, mailed on Oct. 7, 2025, 14 pages.

Bross at al., "Versatile Video Coding (Draft 10)," Joint Video Experts Team (JVET) of ITU-T SG 16 WP 3 and ISO/IEC JTC 1/SC29/WG 11, 19th Meeting: by teleconference, JVET-S2001, Jun. 22-Jul. 1, 2020, 548 pages.

International Search Report International Appln. No. PCT/CN2023/109174, mailed on Nov. 7, 2023, 8 pages (with English translation).

Extended European Search Report in European Appln. No. 23845565.3, mailed on Jan. 26, 2026, 15 pages.

Guo et al., "A New Reference Frame Recompression Algorithm and Its VLSI Architecture for UHDTV Video Codec," IEEE Transactions on Multimedia, 16(8), Dec. 2014, 10 pages.

Office Action in Japanese Appln. No. 2025-504365, mailed on Apr. 7, 2026, 10 pages (with English translation).

* cited by examiner

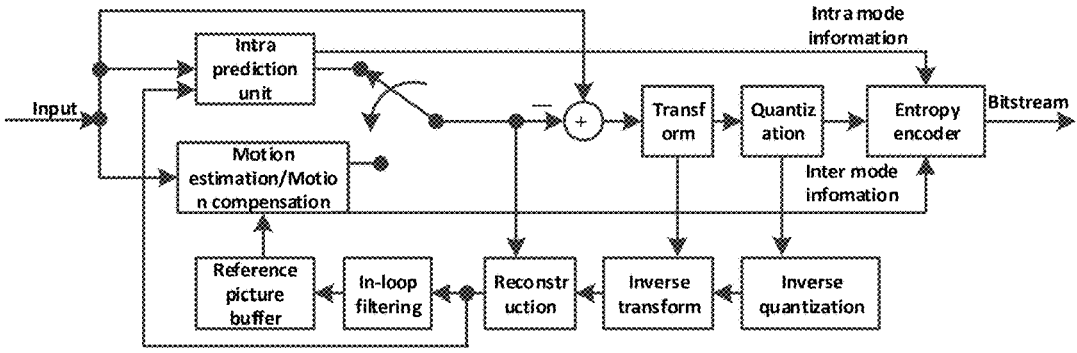

FIG. 1

Residual computing unit

Current picture block

Residual block

Transform processing unit

Quantization unit

Quantized residual coefficient

Encoding unit

Encoded bitstream

Prediction block

Syntax element

Prediction processing unit

Inverse quantization unit

Inverse transform unit

Reconstructed unit

Inverse transformed residual block

Reconstruction unit

Filter unit

FIG. 2A

Encoded bitstream

Decoding unit

Quantized coefficient

Decoded encoding parameter

Inverse quantization unit

Prediction processing unit

Prediction block

Inverse transform unit

Reconstructed block

Inverse transformed residual block

Filter unit

Reconstruction unit

FIG. 2B

Parallel encoding unit 1        Parallel encoding unit 2

Picture

| When a reference pixel of a current block is not available, remove a target prediction mode from an initial prediction mode list corresponding to the current block to obtain a target prediction mode list | ~301 |

| Encode or decode the current block based on the target prediction mode list | ~302 |

When the reference pixels of the first boundary of the current block are not available and the reference pixels of the second boundary of the current block are available, fill the reference pixels of the first boundary based on the reference pixels of the second boundary ⌐601

Encode or decode the current block based on the filled reference pixels of the first boundary and the reference pixels of the second boundary ⌐602

FIG. 6

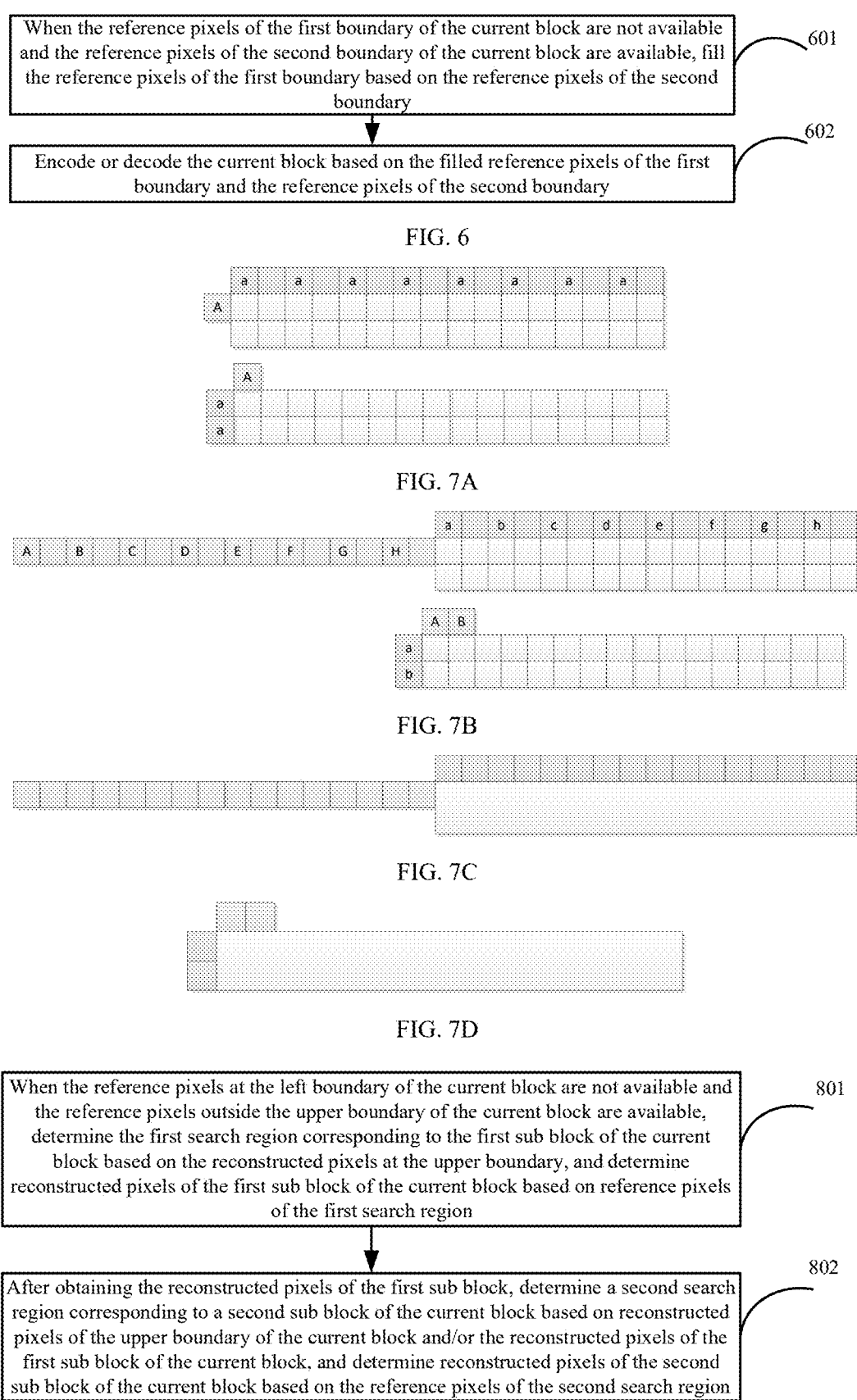

When the reference pixels at the left boundary of the current block are not available and the reference pixels outside the upper boundary of the current block are available, determine the first search region corresponding to the first sub block of the current block based on the reconstructed pixels at the upper boundary, and determine reconstructed pixels of the first sub block of the current block based on reference pixels of the first search region   801

After obtaining the reconstructed pixels of the first sub block, determine a second search region corresponding to a second sub block of the current block based on reconstructed pixels of the upper boundary of the current block and/or the reconstructed pixels of the first sub block of the current block, and determine reconstructed pixels of the second sub block of the current block based on the reference pixels of the second search region   802

FIG. 8A

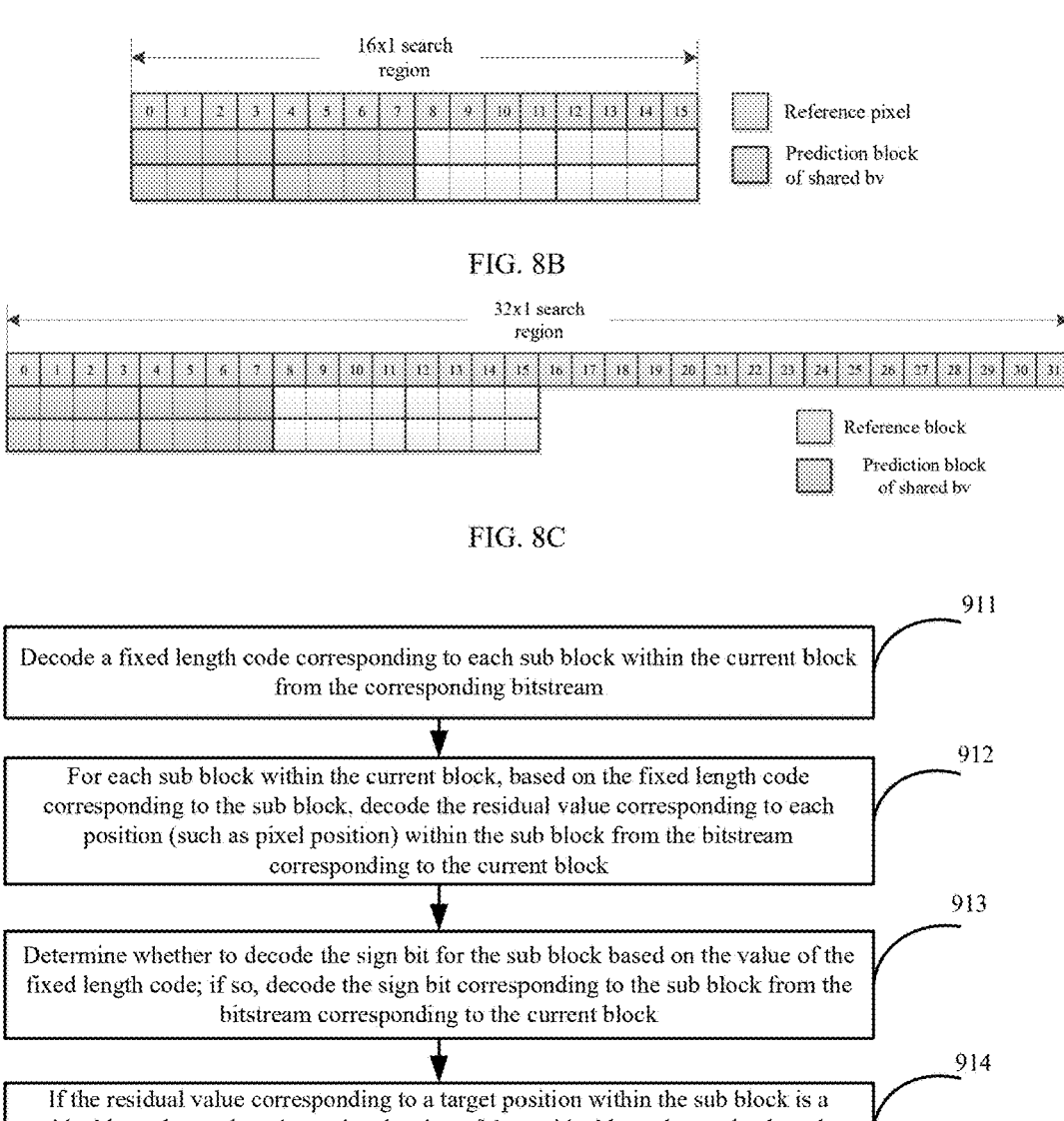

911 Decode a fixed length code corresponding to each sub block within the current block from the corresponding bitstream

912 For each sub block within the current block, based on the fixed length code corresponding to the sub block, decode the residual value corresponding to each position (such as pixel position) within the sub block from the bitstream corresponding to the current block

913 Determine whether to decode the sign bit for the sub block based on the value of the fixed length code; if so, decode the sign bit corresponding to the sub block from the bitstream corresponding to the current block

914 If the residual value corresponding to a target position within the sub block is a residual boundary value, determine the sign of the residual boundary value based on the sign bit, where the target position can be any one position within the sub block

FIG. 9A

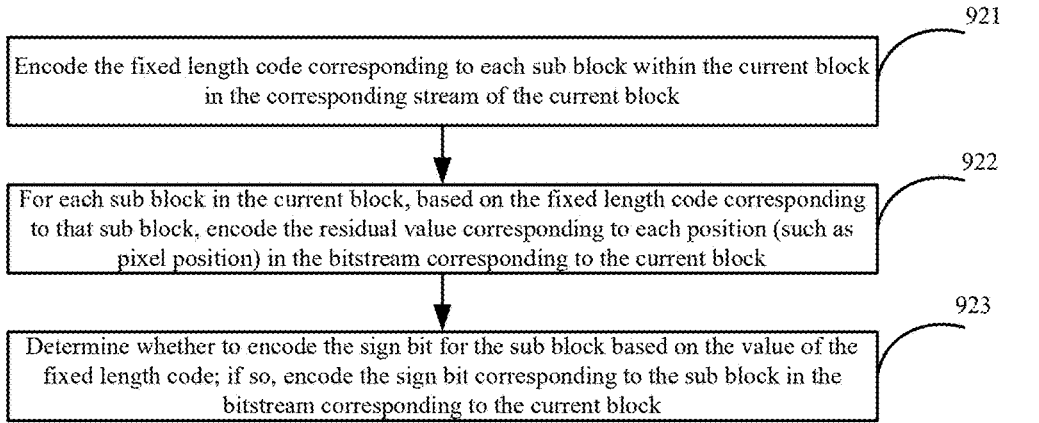

921 Encode the fixed length code corresponding to each sub block within the current block in the corresponding stream of the current block

922 For each sub block in the current block, based on the fixed length code corresponding to that sub block, encode the residual value corresponding to each position (such as pixel position) in the bitstream corresponding to the current block

923 Determine whether to encode the sign bit for the sub block based on the value of the fixed length code; if so, encode the sign bit corresponding to the sub block in the bitstream corresponding to the current block

FIG. 9B

ENCODING AND DECODING METHOD, APPARATUS, AND DEVICE

CROSS REFERENCE TO RELATED APPLICATIONS

This application is a U.S. National Stage of International Application No. PCT/CN2023/109174, filed on Jul. 25, 2023, which claims priority to Chinese Patent Applications No. 202210887893.0, filed on Jul. 26, 2022, the disclosure of which is incorporated herein by reference in its entirety for all purposes.

TECHNICAL FIELD

The present disclosure relates to the field of encoding and decoding technology, in particular to encoding and decoding methods and apparatuses, and devices thereof.

BACKGROUND

In order to save space, video pictures are encoded before transmission, and complete video encoding can include processes such as prediction, transformation, quantization, entropy encoding, filtering, etc. The prediction process can include intra prediction and inter prediction. Inter prediction utilizes a temporal correlation of a video to predict pixels of a current picture by pixels of an adjacent encoded picture, to remove temporal redundancy in the video. Intra prediction utilizes a spatial correlation of a video to predict a current pixel using pixels of encoded blocks in a current frame picture, to remove spatial redundancy in the video.

Lossless compression refers to the technique of compressing redundant information of an original picture and reconstructing for the original picture without causing any distortion. When there are some errors between the reconstructed picture and the original picture, and the errors are limited within a certain range, it can be called Near-Lossless Compression. In the compression encoding process, it is necessary to predict residual values between pixels in the original picture, where the residual values are used to indicate the differences between pixels. Using Semi Fixed-Length Code to encode residual values further reduces the code length. However, Semi Fixed-Length Code technology still has problems such as longer code lengths and lower encoding efficiency.

SUMMARY

In view of this, the present disclosure provides encoding and decoding methods and apparatuses, and devices thereof to improve encoding and decoding performance.

The present disclosure provides an encoding or decoding method, including: when reference pixels of a current block is not available, removing a target prediction mode from an initial prediction mode list corresponding to the current block to obtain a target prediction mode list; and encoding or decoding the current block based on the target prediction mode list.

The present disclosure provides an encoding or decoding method, including: when reference pixels outside a first boundary of a current block is not available and reference pixels outside a second boundary of the current block is available, filling the reference pixels outside the first boundary based on the reference pixels outside the second boundary; and encoding or decoding the current block based on the filled reference pixels outside the first boundary and the filled reference pixels outside the second boundary.

The present disclosure provides an encoding or decoding method. When an intra block copy prediction mode is enabled for a current block, the method includes: when reference pixels outside a left boundary of the current block is not available, and reference pixels outside an upper boundary of the current block is available, determining a first search region corresponding to a first sub block of the current block based on reconstructed pixels outside the upper boundary, and determining reconstructed pixels of the first sub block based on reference pixels of the first search region; and after obtaining the reconstructed pixels of the first sub block, determining a second search region corresponding to a second sub block of the current block based on reconstructed pixels outside the upper boundary, and determining reconstructed pixels of the second sub block based on reference pixels of the second search region; where the current block includes the first sub block and the second sub block.

The present disclosure provides a decoding method, performed by a decoding device, including: decoding a fixed length code corresponding to each sub block within a current block from a bitstream corresponding to the current block: for each sub block within the current block, based on the fixed length code corresponding to the sub block, decoding a residual value corresponding to each position within the sub block from the bitstream corresponding to the current block;

determining whether to decode a sign bit corresponding to the sub block based on a value of the fixed length code corresponding to the sub block; in response to determining to decode the sign bit corresponding to the sub block, decoding the sign bit corresponding to the sub block from the bitstream corresponding to the current block; and when a residual value corresponding to a target position within the sub block is a residual boundary value, determining a sign of the residual boundary value based on the sign bit, where the target position is any one position within the sub block.

The present disclosure provides an encoding or decoding device, including: one or more memories configured to store video data; and a decoder configured to implement: when reference pixels of a current block is not available, removing a target prediction mode from an initial prediction mode list corresponding to the current block to obtain a target prediction mode list; and encoding or decoding the current block based on the target prediction mode list; or when reference pixels outside a first boundary of a current block is not available and reference pixels outside a second boundary of the current block is available, filling the reference pixels outside the first boundary based on the reference pixels outside the second boundary; and encoding or decoding the current block based on the filled reference pixels outside the first boundary and the filled reference pixels outside the second boundary; or when an intra block copy prediction mode is enabled for a current block, reference pixels outside a left boundary of the current block is not available, and reference pixels outside an upper boundary of the current block is available, determining a first search region corresponding to a first sub block of the current block based on reconstructed pixels outside the upper boundary, and determining reconstructed pixels of the first sub block based on reference pixels of the first search region; and after obtaining the reconstructed pixels of the first sub block, determining a second search region corresponding to a second sub block of the current block based on reconstructed pixels outside the upper boundary, and determining reconstructed pixels of the second sub block based on reference pixels of the second search region; where the current block includes the first sub block and the second sub block; or decoding a fixed length code corresponding to each sub block within a current block from a bitstream corresponding to the current block; for each sub block within the current block, based on the fixed length code corresponding to the sub block, decoding a residual value corresponding to each position within the sub block from the bitstream corresponding to the current block: determining whether to decode a sign bit corresponding to the sub block based on a value of the fixed length code corresponding to the sub block; in response to determining to decode the sign bit corresponding to the sub block, decoding the sign bit corresponding to the sub block from the bitstream corresponding to the current block; and when a residual value corresponding to a target position within the sub block is a residual boundary value, determining a sign of the residual boundary value based on the sign bit, where the target position is any one position within the sub block.

The present disclosure provides a decoding device including one or more processors and one or more machine-readable storage media, where the one or more machine-readable storage media store a machine executable instruction that can be executed by the one or more processors; and the one or more processors are configured to execute the machine executable instruction to implement the decoding method according to the above embodiment.

The present disclosure provides an encoding device including one or more processors and one or more machine-readable storage media, where the one or more machine-readable storage media store a machine executable instruction that can be executed by the one or more processors; and the one or more processors are configured to execute the machine executable instruction to implement the encoding method according to the above embodiment.

From the above technical solutions, it can be seen that in the embodiments of the present disclosure, for the current block located at the boundary (e.g. the reference pixels of the current block are not available), considering the redundancy of mode encoding cost, solutions for removing encoding redundancy are proposed. That is, the target prediction mode in the initial prediction mode list is removed to remove the mode that cannot be selected at the boundary. The mode corresponding to the codeword is changed from the code table for the mode encoding to remove encoding redundancy. For the current block located at the boundary (e.g. the reference pixels at the left boundary are not available or the reference pixels at the upper boundary are not available), the encoded reconstruction block is used to derive as many different reference pixels as possible. Based on the reconstruction block, reconstruction values that cannot be obtained by different prediction modes can be derived, and more reference pixel padding schemes can be added, such that the mode that cannot be selected under a single default value padding may be selected after padding with other reference pixels. Optimizing the boundary sign bits of signed fixed length codes is beneficial for improving compression efficiency and reducing hardware costs, such that the parsing of sign bits does not depend on the residual values themselves. It can remove coding redundancy, improve coding efficiency, effectively fill the reference pixels at the boundary, enhance the prediction ability of the boundary position prediction mode, and thus improve the quality of the reconstructed picture at the boundary. Due to coding errors are transmissible, quality improvement is also transmissible, improving overall coding and decoding performance.

BRIEF DESCRIPTION OF DRAWINGS

FIG. 1 is a schematic diagram of a video encoding framework.

FIGS. 2A to 2C are schematic diagrams of a video encoding framework.

FIG. 3 is a flowchart of an encoding and decoding method according to an embodiment of the present disclosure.

FIGS. 4A-4F are schematic diagrams of prediction modes according to embodiments of the present disclosure.

FIG. 6 is a flowchart of an encoding and decoding method according to an embodiment of the present disclosure.

FIGS. 7A-7D are schematic diagrams of padding processes according to embodiments of the present disclosure.

FIG. 8A is a flowchart of an encoding and decoding method according to an embodiment of the present disclosure.

FIGS. 8B-8C are schematic diagrams of search regions according to embodiments of the present disclosure.

FIG. 9A is a flowchart of a decoding method according to an embodiment of the present disclosure.

FIG. 9B is a flowchart of an encoding method according to an embodiment of the present disclosure.

DETAILED DESCRIPTION

Figures 2C, 3, 4A:
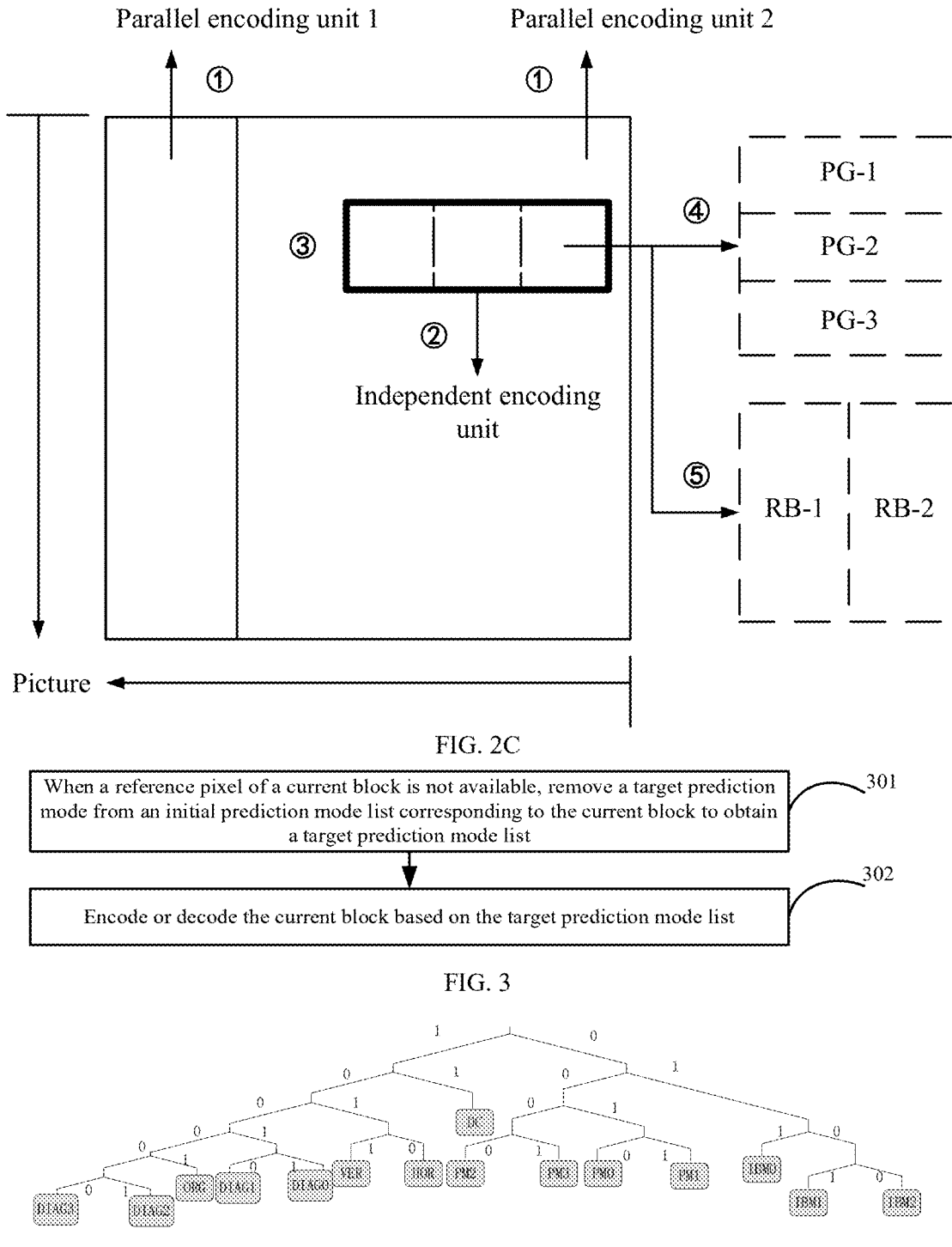

The terms used in the embodiments of the present disclosure are only for the purpose of describing specific embodiments and are not intended to limit the present disclosure. As used in the present disclosure and claims, the singular forms "a", "said", and "the" are intended to include the plural forms as well, unless the context clearly indicates otherwise. It should also be understood that the term "and/or" as used herein refers to and includes any and all possible combinations of one or more of the associated listed items. It shall be understood that, although the terms "first," "second," "third," and the like can be used herein to describe various information, the information should not be limited by these terms. These terms are only used to distinguish the same type of information from each other. For example, without departing from the scope of the present disclosure, first information can be referred as second information; and similarly, second information can also be referred as first information, according to the context. The word "if" as used herein can be interpreted as "at the time of", "when" or "in response to determining that".

The embodiments of the present disclosure propose encoding and decoding methods and apparatuses, and devices thereof, which may involve the following concepts.

Near-Lossless Compression; Near-Lossless Compression is a compression technique between lossless compression and lossy compression. The purpose of Near-Lossless Compression is to achieve higher picture compression quality at a certain compression ratio.

Quantization and Dequantization: Quantization is the process of mapping continuous values (or a large number of discrete values) of signals to a finite number of discrete values, achieving a many-to-one mapping of signal values. In the encoding process of video pictures, after residual signals are transformed, transformation coefficients usually have a large dynamic range. Therefore, quantifying the transformation coefficients can effectively reduce the signal value space and achieve better compression effects. Due to the many-to-one mapping mechanism, the quantization process inevitably introduces distortion, which is the fundamental reason for distortion in video picture encoding. Inverse quantization is the inverse process of quantization, which maps the quantized coefficients to the reconstructed signal in the input signal space. The reconstructed signal is an approximation of the input signal.

Rate-Distortion Optimized: there are two major indicators for evaluating encoding efficiency, code rate and Peak Signal to Noise Ratio (PSNR). The smaller the bitstream, the higher the compression rate, the higher the PSNR, and the better the quality of the reconstructed picture. In mode selection, the discrimination formula is essentially a comprehensive evaluation of the both. For example, the cost corresponding to a mode; J (mode)=D+λ*R, where D represents distortion, which can usually be measured using the SSE index. SSE refers to the mean square sum of the differences between the reconstructed picture block and the source picture. To realize cost consideration, the SAD index can also be used, where the SAD refers to the sum of the absolute differences between the reconstructed picture block and the source picture. λ represents the Lagrange multiplier, and R represents the actual number of bits required for picture block encoding in this mode, including the total number of bits required for encoding mode information, motion information, and residuals, etc. When selecting modes, using the Rate-Distortion Optimized to compare and make decisions on encoding modes can usually ensure the best encoding performance.

Video encoding framework: FIG. 1 is a schematic diagram of the video encoding framework at the encoding device. This video encoding framework can be used to implement the processing flow of the encoding device of the embodiments of the present disclosure. The schematic diagram of the video decoding framework can be similar to FIG. 1 and will not be repeated here. The processing flow of the decoding device of the embodiments of the present disclosure can be implemented using the video decoding framework.

For example, as shown in FIG. 1, the video encoding framework can include modules such as prediction, transform, quantization, entropy encoder, inverse quantization, inverse transform, reconstruction, and filtering, etc. At the encoding device, the processing flow of the encoding device can be achieved through the cooperation between these modules. In addition, the video decoding framework can include modules such as prediction, transform, quantization, entropy decoder, inverse quantization, inverse transform, reconstruction, and filtering, etc. At the decoding device, the processing flow of the decoding device can be achieved through the cooperation between these modules.

There are many encoding tools proposed for each module of the encoding device, and each tool usually has multiple modes. For different video sequences, the encoding tools that can achieve optimal encoding performance are often different. Therefore, in the encoding process. Rate-Distortion Optimize (RDO) is usually used to compare the encoding performance of different tools or modes to select the best mode. After determining the optimal tool or mode, the decision information of the tool or mode is transmitted by encoding flag information in the bitstream. Although this approach brings high encoding complexity, it can adaptively select the optimal mode combination for different contents to achieve the best encoding performance. The decoding device can obtain relevant mode information by directly parsing the flag information, with minimal complexity impact.

For example, for modules such as prediction, transformation, quantization, entropy encoding, and filtering, the prediction module includes intra frame prediction and inter frame prediction. Intra frame prediction uses reconstructed pixels around the current block to make prediction and remove spatial redundancy, and inter frame prediction uses reconstructed pixels on a time-domain reference frame to make predictions and remove temporal redundancy. The transformation module linearly maps the residual information in the spatial domain to the transformation domain (such as the frequency domain), with the goal of concentrating energy and removing the frequency domain correlation of the signal. In theory, the transformation matrix is reversible and does not cause signal loss. The quantization module is a "many-to-one" mapping process that is irreversible and can result in signal loss. The advantage is that the quantization module can significantly reduce the range of signal values, allowing the encoder to provide a good approximation of the original signal with a small number of symbols, thereby improving the compression rate. The entropy encoding module is a lossless encoding method based on the principle of information entropy, which converts a series of element symbols (such as transform coefficients and mode information) used to represent video sequences into a binary stream, and removes the statistical redundancy of these video element symbols. The filtering module enhances the reconstructed picture, to make the reconstructed picture closer to the original picture, reduce the effects of the block effect and the ringing effect, and improve the quality of the reconstructed picture.

Below is a brief introduction to the structure of the encoding device and the decoding device. FIG. 2A is a schematic block diagram of an example of the encoding device used to implement the embodiments of the present disclosure. In FIG. 2A, the encoding device includes a prediction processing unit, a residual calculating unit, a transform processing unit, a quantization unit, an encoding unit, an inverse quantization unit (also referred to as an anti-quantization unit), an inverse transform processing unit (also referred to as an anti-transform processing unit), a reconstruction unit (also referred to as a rebuild unit), and a filter unit. In an example, the encoding device can further include a buffer and a decoded picture buffer, where the buffer is configured to cache the reconstructed picture blocks output by the reconstruction unit, and the decoded picture buffer is configured to cache the filtered picture blocks output by the filter unit.

The input of the encoding device (also referred to as the encoder) is the picture block of the picture (which can be referred to as the to-be-encoded picture), and the picture block can also be referred to as the current block or the to-be-encoded block. The encoding device can further include a segmentation unit (not shown in the figures), where the segmentation unit is configured to split the to-be-encoded picture into multiple picture blocks. The encoding device is configured for block by block encoding to complete the encoding of the to-be-encoded picture, for example, performing the encoding process on each picture block. The prediction processing unit is configured to receive or obtain a picture block (the current block of the to-be-encoded picture, also referred to as the current block, where the picture block can be understood as the true value of the picture block) and reconstructed picture data. Based on the relevant data in the reconstructed picture data, the prediction processing unit predicts the current block and obtains the prediction block for the current block. In an example, the prediction processing unit can include an inter prediction unit, an intra prediction unit, and a mode selection unit. The mode selection unit is configured to select an intra prediction mode or an inter prediction mode. If the intra prediction mode is selected, the prediction process is performed by the intra prediction unit. If the inter prediction mode is selected, the prediction process is performed by the inter prediction unit.

The residual calculating unit is configured to calculate the residual between the true value of a picture block and the prediction block of the picture block, to obtain the residual block. For example, the residual calculating unit can subtract the pixel value of the prediction block from the pixel value of the picture block pixel by pixel.

The transform processing unit is configured to perform transform (such as discrete cosine transform (DCT) or discrete sine transform (DST)) on the residual block, to obtain transform coefficients in a transform domain. The transform coefficients can also be referred to as transform residual coefficients, and the transform residual coefficients can represent a residual block in the transform domain.

The quantization unit is configured to quantize the transform coefficients by applying scalar quantization or vector quantization to obtain quantized transform coefficients, and the quantized transform coefficients can also be referred to as quantized residual coefficients. The quantization process can reduce the bit depth associated with some or all of the transform coefficients. For example, during quantization, a transform coefficient of n bits can be rounded down to a transform coefficient of m bits, where n is greater than m. The degree of quantization can be modified by adjusting the quantization parameter (QP). For example, for scalar quantization, different scales can be applied to achieve finer or coarser quantization. A smaller quantization step corresponds to finer quantization, and a larger quantization step corresponds to coarser quantization. The appropriate quantization stride can be indicated by a quantization parameter (QP).

The encoding unit is configured to encode the quantized residual coefficients, and output the encoded picture data (such as the encoding result of the current to-be-encoded picture block) in the form of an encoded bitstream. Then, the encoded bitstream is transmitted to the decoder or stored, and subsequently transmitted to the decoder or used for retrieval. The encoding unit can further be configured to encode other syntax elements of the current picture block, such as encoding the prediction mode into the bitstream. The encoding algorithm include but is not limited to variable length coding (VLC) algorithm, context adaptive VLC (CAVLC) algorithm, arithmetic coding algorithm, context adaptive binary arithmetic coding (CABAC) algorithm, syntax-based context-adaptive binary arithmetic coding (SBAC) algorithm, or probability interval partitioning entropy (PIPE) algorithm.

The inverse quantization unit is configured to perform inverse quantization on the quantized coefficients to obtain the inverse quantized coefficients. The inverse quantization is the inverse application of the quantization unit. For example, based on or using the same quantization stride as the quantization unit, an inverse quantization scheme for the quantization scheme applied by the quantization unit is applied. The inverse quantized coefficients can also be referred to as inverse quantized residual coefficients.

The inverse transform processing unit is configured to perform inverse transform on the inverse quantized coefficients. It should be understood that this inverse transform is the inverse application of the aforementioned transform processing unit. For example, the inverse transform can include inverse discrete cosine transform (IDCT) or inverse discrete sine transform (IDST) to obtain the inverse transform block in the pixel domain (or sample domain). The inverse transform block can also be referred to as the inverse transform quantized block or the inverse transform residual block.

The reconstruction unit is configured to add the inverse transform block (such as the inverse transform residual block) to the prediction block to obtain the reconstructed block in the sample domain. The reconstruction unit can be a summer, e.g., to add the sample values (such as pixel values) of the residual block to the sample values of the prediction block. The reconstructed block output by the reconstruction unit can be subsequently used for predicting other picture blocks, e.g., can be used in intra prediction mode.

The filter unit (or simply "filter") is configured to filter the reconstructed block to obtain a filtered block, to smoothly performing pixel transform or improving picture quality. The filter unit can be a loop filter unit (such as one or more loop filters). For example, the filter unit can be a deblocking filter, a sample-adaptive offset (SAO) filter, a bilateral filter, an adaptive loop filter (ALF), a sharpening or smoothing filter, a collaborative filter, or other filters. In an example, the filtered block output by the filtering unit can be subsequently used for predicting other picture blocks, e.g., can be used in inter prediction mode, which is not limited in the present disclosure.

FIG. 2B is a schematic block diagram of an example of a decoding device (also referred to as a decoder) used for implementing the embodiments of the present disclosure. The decoder is configured to receive encoded picture data (i.e., an encoded bitstream, such as an encoded bitstream including a picture block and associated syntax elements) encoded by an encoder, to obtain a decoded picture. The decoder can include a decoding unit, an inverse quantization unit, an inverse transform processing unit, a prediction processing unit, a reconstruction unit, and a filter unit. In some embodiments, the decoder can perform decoding passes that are generally inverse of the encoding passes described for the encoder in FIG. 2A. In an example, the decoder can further include a buffer and a decoded picture buffer, where the buffer is configured to cache the reconstructed picture blocks output by the reconstruction unit, and the decoded picture buffer is configured to cache the filtered picture blocks output by the filter unit.

The decoding unit is configured to decode encoded picture data to obtain quantized coefficients and/or decoded encoding parameters (e.g., decoding parameters can include any one or all of inter prediction parameters, intra prediction parameters, filter parameters, and/or other syntax elements). The decoding unit is further configured to forward the decoded encoding parameters to the prediction processing unit, such that the prediction processing unit can perform the prediction process based on the encoding parameters. The function of the inverse quantization unit can be the same as the function of the inverse quantization unit of the encoder, and the inverse quantization unit can be configured for inverse quantization (may be also referred to as anti-quantization) of the quantized coefficients decoded by the decoding unit.

The function of the inverse transform processing unit can be the same as the function of the inverse transform processing unit of the encoder, and the function of the reconstruction unit (such as a summer) can be the same as the function of the reconstruction unit of the encoder, which are configured to perform inverse transform (such as inverse DCT, inverse integer transform, or conceptually similar inverse transform process) on the quantized coefficients, to obtain an inverse transform block (also referred to as an inverse transform residual block), where the inverse transform block is the residual block of the current picture block in the pixel domain.

The prediction processing unit is configured to receive or obtain encoded picture data (such as the encoded bitstream of the current picture block) and reconstructed picture data. The prediction processing unit can further receive or obtain prediction related parameters and/or information (such as decoded encoding parameters) about the selected prediction mode from, e.g., the decoding unit, and predict the current picture block based on the relevant data in the reconstructed picture data and the decoded encoding parameters to obtain the prediction block of the current picture block.

In an example, the prediction processing unit can include an inter prediction unit, an intra prediction unit, and a mode selection unit. The mode selection unit is configured to select an intra prediction mode or an inter prediction mode. If the intra prediction mode is selected, the prediction process is performed by the intra prediction unit. If the inter prediction mode is selected, the prediction process is performed by the inter prediction unit.

The reconstruction unit is configured to add the inverse transform block (such as the inverse transform residual block) to the prediction block to obtain the reconstructed block in the sample domain. For example, the sample values of the inverse transform residual block can be added to the sample values of the prediction block.

The filter unit is configured to filter the reconstructed block to obtain the filtered block, where the filtered block is the decoded picture block.

It should be understood that in the encoder and decoder of the embodiments of the present disclosure, the processing result of a certain step can also be further processed and output to the next step. For example, after interpolation filtering, motion vector derivation, or filtering, the processing result of a corresponding step can be further clipped or shifted.

On the basis of the encoder and decoder, the embodiments of the present disclosure provides an embodiment of encoding/decoding, as shown in FIG. 2C. FIG. 2C is a flowchart of an encoding and decoding process provided in the embodiments of the present disclosure, the embodiment of the encoding/decoding includes processes 1 to 5, where the processes 1 to 5 can be executed by the aforementioned decoder and encoder. In process 1, a picture of a frame is split into one or more non overlapping parallel coding units.

The one or more parallel coding units do not depend on each other and can encode and decode completely in parallel and independently of each other, as shown in the parallel coding unit 1 and the parallel coding unit 2 in FIG. 2C.

In process 2, for each parallel coding unit, the parallel coding unit can be further split into one or more independent coding units that do not overlap with each other. The one or more independent coding units can be independent of each other, but can share some header information of one parallel coding unit. For example, the width of an independent coding unit is w_lcu, and the height of an independent coding unit is h-lcu. If the parallel coding unit is split into one independent coding unit, the size of the independent coding unit is exactly the same as the size of the parallel coding unit. If the parallel coding unit is split into multiple independent coding unit, the width of the independent coding unit should be greater than the height of the independent coding unit (unless the independent coding unit is at an edge region).

Usually, an independent coding unit can be fixed w_lcu× h-lcu, where w_lcu and h-lcu are both 2 to the power of N (N≥0). For example, the size of the independent coding unit can be 128×4, 64×4, 32×4, 16×4, 8×4, 32×2, 16×2, or 8×2.

For example, the independent coding unit can be a fixed 128×4. If the size of the parallel coding unit is 256×8, the parallel coding unit can be split into 4 independent coding units. If the size of the parallel coding unit is 288×10, the parallel coding unit is split into; each of the first row and the second row is 2 independent coding units of 128×4 and 1 independent coding unit of 32×4, and the third row consists of 2 independent coding units of 128×2 and 1 independent coding unit of 32×2. It is worth noting that an independent coding unit can include three components of luminance Y, chrominance Cb, and chrominance Cr, or three components of red (R), green (G), and blue (B), or three components of luminance Y, chrominance Co, and chrominance Cg. Alternatively, an independent coding unit can only include one component of them. If the independent coding unit contains three components, the sizes of these three components can be exactly the same or different, depending on the input format of the picture.

In process 3, for each independent coding unit, the independent coding unit can be further split into one or more non overlapping sub coding units. The sub coding units within the independent coding unit can depend on each other, e.g., multiple sub coding units can perform pre encoding/decoding through cross reference.

If the size of the sub coding unit is the same as the size of the independent coding unit (i.e., the independent coding unit is only split into one sub coding unit), the size of the sub coding unit can be one of all the sizes described in process 2. If an independent coding unit is split into multiple non overlapping sub coding units, examples of splitting include: horizontal splitting (the height of the sub coding unit is the same as the height of the independent coding unit, but the width is different, where the width of the sub coding unit can be ½, ¼, ⅛, or 1/16, etc, the width of the independent coding unit), vertical splitting (the width of the sub coding unit is the same as the width of the independent coding unit, but the height is different, where the height of the sub coding unit can be ½, ¼, ⅛, or 1/16, etc, the height of the independent coding unit), or horizontal and vertical splitting (quadtree splitting), etc. In some embodiment, horizontal splitting is adopted.

The width of the sub coding unit is w_cu and the height of the sub coding unit is h-cu, and the width is greater than the height unless the sub coding unit is at an edge region.

Usually, the sub coding unit is fixed w_cu×h-cu, where w_cu and h-cu are both 2 to the power of N (N is greater than or equal to 0), such as 16×4, 8×4, 16×2, 8×2, 8×1, or 4×1, etc. If the sub coding unit is a fixed 16×4. If the size of the independent coding unit is 64×4, the independent coding unit is split into 4 sub coding units. If the size of the independent coding unit is 72×4, the split sub coding units are; four 16×4 and one 8×4. It is worth noting that a sub coding unit can include three components of luminance Y, chrominance Cb, and chrominance Cr, or three components of red (R), green (G), and blue (B), or three components of luminance Y, chrominance Co, and chrominance Cg. Alternatively, a sub coding unit can only include one component of them. If a sub coding unit includes three components, the sizes of components can be exactly the same or different, depending on the input format of the picture.

It is worth noting that process 3 can be an optional step in the encoding and decoding method, and the encoder/decoder can encode or decode the residual coefficients (or residual values) of the independent coding units obtained in process 2.

In process 4, a sub coding unit can be further split into one or more non overlapping prediction groups (PGs), where PG can be abbreviated as Group. PGs are encoded or decoded according to the selected prediction mode to obtain the prediction values of the PGs, which form the prediction value of the entire sub coding unit. Based on the prediction value of the sub coding unit and the original value, the residual value of the sub coding unit is obtained.

In process 5, based on the residual values of the sub coding units, the sub coding units are grouped into obtain one or more non overlapping residual blocks (RBs). The residual coefficient of each RB is encoded and decoded according to a selected mode to form a residual coefficient bitstream. For example, it can be split into two categories; transforming residual coefficients and not transforming them.

Where the selected mode of residual coefficient encoding and decoding method in process 5 can include, but is not limited to, any one of the following; semi fixed length encoding method, exponential Golomb encoding method. Golomb-Rice encoding method, truncated unary code encoding method, run length encoding method, or direct encoding of original residual values, etc. For example, the encoder can directly encode the coefficient within the RB. For example, the encoder can also perform transform (such as DCT, DST, or Hadamard transform, etc.) on the residual block, and then encode the transformed coefficient. For example, when the RB is small, the encoder can directly perform unified quantization on each coefficient within the RB and then perform binary encoding. If the RB is large, the RB can be further split into multiple coefficient groups (CGs), and each CG can be uniformly quantized and then binary encoded. In some embodiments of the present disclosure, the coefficient group (CG) and quantization group (QG) can be the same, or the coefficient group and quantization group can also be different.

Below is an exemplary explanation of the residual coefficient encoding using a semi fixed length encoding method. Firstly, a maximum absolute value of a residual within an RB block is defined as a modified maximum (MM). Secondly, the number of encoding bits for the residual coefficients within the RB block (the number of encoding bits for residual coefficients within the same RB block is consistent). For example, if the critical limit (CL) of the current RB block is 2 and the current residual coefficient is 1, encoding residual coefficient 1 requires 2 bits, represented as 01. If the CL of the current RB block is 7, it represents encoding 8-bit residual coefficients and 1-bit sign bit. The determination of CL is to find the minimum M value that satisfies the condition that all residuals in the current sub block are within the range of $[-2^{(M-1)}, 2^{(M-1)}]$. If there are two boundary values, $-2^{(M-1)}$ and $2^{(M-1)}$ at the same time. M increases by 1, which requires M+1 bits to encode all residuals of the current RB block. If there is only one of the two boundary values $-2^{(M-1)}$ or $2^{(M-1)}$, a Trailing bit is encoded to determine whether the boundary value is $-2^{(M-1)}$ or $2^{(M-1)}$. If none of the residuals exist in either $-2^{(M-1)}$ or $2^{(M-1)}$, there is no need to encode a Trailing bit. For certain special cases, the encoder can directly encode the original value of the picture instead of the residual value.

In an embodiment, for cases where prediction values cannot be obtained for the boundary, a default value is generally used as padding, where the default value is usually $1<<(bitdepth-1)$ or $(1<<(bitdepth-1)-1)$. When the picture bit width is 8, the bitdepth is equal to 8, that is, the default value for padding is 128 or 127. Padding with a single default value can result in identical prediction values across multiple prediction modes. Therefore, during the encoding process, some modes cannot be selected, leading to encoding redundancy.

For the above findings, the embodiments of the present disclosure propose an encoding and decoding method. For the encoding unit(s) at the boundary (such as the current block) and for the modes that cannot be selected at the boundary, the decoding code table is modified by changing the mode corresponding to the codeword, such that the available modes at the boundary are reduced, and longer codewords in the code table are deleted, thereby achieving the goal of removing encoding redundancy.

The following provides a detailed explanation of the encoding and decoding methods in the embodiments of the present disclosure, based on several embodiments.

Embodiment 1: the embodiments of the present disclosure propose an encoding and decoding method that can be applied to both the decoding device (also known as a video decoder) and the encoding device (also known as a video encoder). For the decoding device, the encoding and decoding method can be a decoding method, and for the encoding device, the encoding and decoding method can be an encoding method.

As shown in FIG. 3. FIG. 3 is a flowchart of an encoding and decoding method. The method may include steps 301 to 302.

In step 301, when a reference pixel of a current block is not available, a target prediction mode is removed from an initial prediction mode list corresponding to the current block to obtain a target prediction mode list. For example, the initial prediction mode list includes multiple prediction modes, and the target prediction mode is a prediction mode in the initial prediction mode list that the current block will not use when the reference pixel is not available.

In step 302, the current block is encoded or decoded based on the target prediction mode list.

For example, for the decoding device, a prediction mode can be selected from the target prediction mode list as a determined prediction mode, and the current block can be decoded based on the determined prediction mode. The decoding process is not limited in the present disclosure.

For example, for the encoding device, a prediction mode can be selected from the target prediction mode list as a determined prediction mode, and the current block can be encoded based on the determined prediction mode. The encoding process is not limited in the present disclosure.

For example, the reference pixel of the current block being not available may include that; the reference pixel outside (e.g., of, at or on) the upper boundary of the current block is not available, and the reference pixel outside (e.g., of, at or on) the left boundary of the current block is available; the reference pixel outside the left boundary of the current block is not available, and the reference pixel outside the upper boundary of the current block is available; or the reference pixel outside the upper boundary of the current block is not available, and the reference pixel at the left boundary of the current block is not available.

Removing the target prediction mode from the initial prediction mode list corresponding to the current block can include, but is not limited to, determining multiple candidate prediction modes in the initial prediction mode list, where the candidate prediction mode is a prediction mode in the initial prediction mode list that the current block will not use when the reference pixel is not available; selecting at least one prediction mode from all candidate prediction modes as the first target prediction mode; and removing the first target prediction mode from the initial prediction mode list.

For example, selecting at least one prediction mode from all candidate prediction modes as the first target prediction mode may include but is not limited to: based on the length of the codeword corresponding to each candidate prediction mode, selecting K candidate prediction modes from all candidate prediction modes as the retained prediction modes, where K is a positive integer; and determining a candidate prediction mode other than the retained prediction mode as the first target prediction mode. For example, if K is 1, the retained prediction mode is the candidate prediction mode with the smallest codeword length. That is, the candidate prediction mode with the smallest codeword length is selected as the retained prediction mode, and the remaining candidate prediction modes are selected as the first target prediction mode. For example, if K is 2, the retained prediction modes are the candidate prediction mode with the smallest codeword length and the candidate prediction mode with the second smallest codeword length. For example, if K is 1, the retained prediction mode is any one of the candidate prediction modes. For example, if K is 2, the retained prediction modes are any two of the candidate prediction modes. The above are just a few examples, which is not limited. The value of K can be configured arbitrarily, and the retained prediction mode can also be selected arbitrarily.

For example, selecting at least one prediction mode from all candidate prediction modes as the first target prediction mode may include, but is not limited to, selecting L candidate prediction modes from all candidate prediction modes as the first target prediction modes based on the codeword length corresponding to each candidate prediction mode, where L is a positive integer and less than the number of all candidate prediction modes. For example, all candidate prediction modes are ordered according to the length of the codeword of each candidate prediction mode. Starting from the candidate prediction mode with the longest codeword length. L candidate prediction modes are selected as the first target prediction modes, where L is 1, 2, 3, or 4, etc., and L is less than the number of all candidate prediction modes. For example, L candidate prediction modes can be arbitrarily selected from all candidate prediction modes as the first target prediction modes. The above are just a few examples, and the value of L can be configured arbitrarily, and the first target prediction mode can also be selected arbitrarily.

For example, candidate prediction modes may include but are not limited to multiple of the following prediction modes: DC prediction mode, DIAG0 prediction mode, DIAG1 prediction mode, DIAG2 prediction mode, DIAG3 prediction mode, VER prediction mode, HOR prediction mode, IBM0 prediction mode, IBM1 prediction mode, or IBM2 prediction mode. For example, candidate prediction modes can include DC prediction mode, DIAG0 prediction mode, DIAG1 prediction mode, DIAG2 prediction mode, DIAG3 prediction mode, VER prediction mode, HOR prediction mode, IBM0 prediction mode, IBM1 prediction mode, and IBM2 prediction mode.

The first target prediction mode may include but is not limited to at least one of the following prediction modes: DC prediction mode, DIAG0 prediction mode, DIAG1 prediction mode, DIAG2 prediction mode, DIAG3 prediction mode, VER prediction mode, HOR prediction mode, IBM0 prediction mode, IBM1 prediction mode, or IBM2 prediction mode. For example, one prediction mode (which can be any prediction mode) can be removed from the above prediction modes, and the first target prediction modes include the remaining prediction modes.

In an embodiment, if the reference pixel(s) at the upper boundary of the current block is not available and the reference pixel(s) at the left boundary of the current block is available, the candidate prediction modes may include but are not limited to multiple of the following prediction modes: DC prediction mode, DIAG0 prediction mode, DIAG1 prediction mode, DIAG2 prediction mode, DIAG3 prediction mode, or VER prediction mode. For example, candidate prediction modes can include DC prediction mode, DIAG0 prediction mode, DIAG1 prediction mode, DIAG2 prediction mode, DIAG3 prediction mode, and VER prediction mode. The first target prediction mode may include but is not limited to at least one of the following prediction modes: DC prediction mode, DIAG0 prediction mode, DIAG1 prediction mode, DIAG2 prediction mode, DIAG3 prediction mode, or VER prediction mode. For example, one prediction mode (which can be any prediction mode) can be removed from the above prediction modes, and the first target prediction modes include the remaining prediction modes. For example, when the DC prediction mode is removed from the above prediction modes, the first target prediction modes include DIAG0 prediction mode, DIAG1 prediction mode, DIAG2 prediction mode, DIAG3 prediction mode, and VER prediction mode. When the VER prediction mode is removed from the above prediction modes, the first target prediction modes include DC prediction mode, DIAG0 prediction mode, DIAG1 prediction mode, DIAG2 prediction mode, and DIAG3 prediction mode. For example, two prediction mode (which can be any two prediction modes) can be removed from the above prediction modes, and the first target prediction modes include the remaining prediction modes. For example, when the DC prediction mode and VER prediction mode are removed from the above prediction modes, the first target prediction modes include DIAG0 prediction mode, DIAG1 prediction mode, DIAG2 prediction mode, and DIAG3 prediction mode. The above are only examples of candidate prediction modes and the first target prediction mode.

In an embodiment, when the reference pixel(s) at the left boundary of the current block is not available and the reference pixel(s) at the upper boundary of the current block is available, the candidate prediction modes may include but are not limited to multiple of the following prediction modes: HOR prediction mode, IBM0 prediction mode, IBM1 prediction mode, or IBM2 prediction mode. For example, candidate prediction modes can include HOR prediction mode, IBM0 prediction mode, IBM1 prediction mode, and IBM2 prediction mode. The first target prediction mode may include but is not limited to at least one of the following prediction modes: HOR prediction mode, IBM0 prediction mode, IBM1 prediction mode, or IBM2 prediction mode. For example, one prediction mode (which can be any prediction mode) can be removed from the above prediction modes, and the first target prediction modes include the remaining prediction modes. For example, when the HOR prediction mode is removed from the above prediction modes, the first target prediction modes include IBM0 prediction mode, IBM1 prediction mode, and IBM2 prediction mode.

The above are only examples of candidate prediction modes and the first target prediction mode, which is not limited.

In an embodiment, when the reference pixel(s) at the upper boundary of the current block is not available, and the reference pixel(s) at the left boundary of the current block is not available, candidate prediction modes may include but are not limited to multiple prediction modes of the following: DC prediction mode, DIAG0 prediction mode, DIAG1 prediction mode, DIAG2 prediction mode, DIAG3 prediction mode, VER prediction mode, HOR prediction mode, IBM0 prediction mode, IBM1 prediction mode, or IBM2 prediction mode. For example, candidate prediction modes can include DC prediction mode, DIAG0 prediction mode, DIAG1 prediction mode, DIAG2 prediction mode, DIAG3 prediction mode, VER prediction mode, HOR prediction mode, IBM0 prediction mode, IBM1 prediction mode, and IBM2 prediction mode. The first target prediction mode may include but is not limited to at least one of the following prediction modes: DC prediction mode, DIAG0 prediction mode, DIAG1 prediction mode, DIAG2 prediction mode, DIAG3 prediction mode, VER prediction mode, HOR prediction mode, IBM0 prediction mode, IBM1 prediction mode, or IBM2 prediction mode. For example, one prediction mode (which can be any prediction mode) can be removed from the above prediction modes, and the first target prediction modes include the remaining prediction modes. For example, when the DC prediction mode is removed from the above prediction modes, the first target prediction modes include DIAG0 prediction mode, DIAG1 prediction mode, DIAG2 prediction mode, DIAG3 prediction mode, VER prediction mode, HOR prediction mode, IBM0 prediction mode, IBM1 prediction mode, and IBM2 prediction mode. For example, when the HOR prediction mode is removed from the above prediction modes, the first target prediction modes include DC prediction mode, DIAG0 prediction mode, DIAG1 prediction mode, DIAG2 prediction mode, DIAG3 prediction mode, VER prediction mode, IBM0 prediction mode, IBM1 prediction mode, and IBM2 prediction mode. For example, two prediction mode (which can be any two prediction modes) can be removed from the above prediction modes, and the first target prediction modes include the remaining prediction modes. For example, when the DC prediction mode and HOR prediction mode are removed from the above prediction modes, the first target prediction modes include DIAG0 prediction mode, DIAG1 prediction mode, DIAG2 prediction mode, DIAG3 prediction mode, VER prediction mode, IBM0 prediction mode, IBM1 prediction mode, and IBM2 prediction mode.

The above are only examples of candidate prediction modes and the first target prediction mode, which is not limited.

In an embodiment, removing the target prediction mode from the initial prediction mode list corresponding to the current block can include but is not limited to: determining a second target prediction mode in the initial prediction mode list, where the second target prediction mode in the initial prediction mode list is a prediction mode that the current block will not use when the reference pixel is not available; and removing the second target prediction mode from the initial prediction mode list. Unlike the above method, in this embodiment, there is no need to select candidate prediction modes from the initial prediction mode list, and select the first target prediction mode from the candidate prediction modes. Instead, the second target prediction mode is directly selected in initial prediction mode list. To distinguish from the first target prediction mode mentioned above, the target prediction mode in this embodiment is referred to as the second target prediction mode.

For example, the second target prediction mode may include but is not limited to at least one of the following prediction modes: DC prediction mode, DIAG0 prediction mode, DIAG1 prediction mode, DIAG2 prediction mode, DIAG3 prediction mode, VER prediction mode, HOR prediction mode, IBM0 prediction mode, IBM1 prediction mode, or IBM2 prediction mode. For example, one prediction mode (which can be any prediction mode) can be removed from the above prediction modes, and the second target prediction modes include the remaining prediction modes.

For example, when the reference pixel(s) at the upper boundary of the current block is not available, but the reference pixel(s) at the left boundary of the current block is available, the second target prediction mode may include but is not limited to at least one of: DC prediction mode, DIAG0 prediction mode, DIAG1 prediction mode, DIAG2 prediction mode, DIAG3 prediction mode, or VER prediction mode. For example, the second target prediction modes include DIAG0 prediction mode, DIAG1 prediction mode, DIAG2 prediction mode, DIAG3 prediction mode, and VER prediction mode. Alternatively, the second target prediction modes may include DC prediction mode, DIAG0 prediction mode, DIAG1 prediction mode, DIAG2 prediction mode, and DIAG3 prediction mode. Alternatively, the second target prediction mode may include DIAG0 prediction mode, DIAG1 prediction mode, DIAG2 prediction mode, and DIAG3 prediction mode.

For example, when the reference pixel(s) at the left boundary of the current block is not available and the reference pixel(s) at the upper boundary of the current block is available, the second target prediction mode may include but is not limited to at least one of: HOR prediction mode, IBM0 prediction mode, IBM1 prediction mode, or IBM2 prediction mode. For example, the second target prediction modes include IBM0 prediction mode, IBM1 prediction mode, and IBM2 prediction mode.

For example, the second target prediction mode may include but is not limited to at least one of the following prediction modes: DC prediction mode, DIAG0 prediction mode, DIAG1 prediction mode, DIAG2 prediction mode, DIAG3 prediction mode, VER prediction mode, HOR prediction mode, IBM0 prediction mode, IBM1 prediction mode, or IBM2 prediction mode. For example, the second target prediction modes include DIAG0 prediction mode, DIAG1 prediction mode, DIAG2 prediction mode, DIAG3 prediction mode, VER prediction mode, HOR prediction mode, IBM0 prediction mode, IBM1 prediction mode, and IBM2 prediction mode. Alternatively, the second target prediction modes may include DC prediction mode, DIAG0 prediction mode, DIAG1 prediction mode, DIAG2 prediction mode, DIAG3 prediction mode, VER prediction mode, IBM0 prediction mode, IBM1 prediction mode, and IBM2 prediction mode. Alternatively, the second target prediction modes can include DIAG0 prediction mode, DIAG1 prediction mode, DIAG2 prediction mode, DIAG3 prediction mode, VER prediction mode, IBM0 prediction mode, IBM1 prediction mode, and IBM2 prediction mode.

For example, the above execution order is only for the convenience of describing the given examples. In practical applications, the execution order of steps can also be changed without limitation. Moreover, in other embodiments, the steps of the corresponding method can not necessarily be executed in the order shown and described in the specification, and the steps included in the method can be more or less than those described in the specification. In addition, the single step described in the specification can be decomposed into multiple steps for description in other embodiments. The multiple steps described in the specification can also be combined into a single step for description in other embodiments.

From the above technical solutions, it can be seen that in the embodiments of the present disclosure, for the current block located at the boundary (i.e., the reference pixels of the current block are not available), considering the redundancy of mode encoding cost, solutions for removing encoding redundancy are proposed. That is, the target prediction mode in the initial prediction mode list is removed to remove the mode that cannot be selected at the boundary. The mode corresponding to the codeword is changed from the code table for the mode encoding to remove encoding redundancy, which can improve encoding efficiency, enhance the prediction ability of the boundary position prediction mode, improve the quality of the reconstructed picture at the boundary, and improve encoding and decoding performance.

Embodiment 2: For Embodiment 1, when pixels outside the slice boundary are not available, prediction values of some prediction modes cannot be obtained. Therefore, these prediction modes cannot be selected. For such encoding blocks, the number of prediction modes will be reduced, and mode encoding can be adjusted accordingly to save bit overhead. In summary, for the encoding unit(s) (such as the current block) at the boundary, for the prediction modes that cannot be selected at the boundary, the parsed code table is modified by changing the mode corresponding to the codeword to reduce the available prediction modes at the boundary. The longer codewords in the code table are deleted to remove coding redundancy.

As shown in FIG. 4A, which is a schematic diagram of mode encoding, the initial prediction mode list corresponding to the current block can include but is not limited to: DC prediction mode, DIAG0 prediction mode, DIAG1 prediction mode, DIAG2 prediction mode, DIAG3 prediction mode, VER prediction mode, HOR prediction mode, IBM0 prediction mode, IBM1 prediction mode, IBM2 prediction mode, ORG prediction mode, PM0 prediction mode, PM1 prediction mode, PM2 prediction mode, and PM3 prediction mode.

From FIG. 4A, it can be seen that the codeword corresponding to DC prediction mode is 11, the codeword corresponding to DIAG0 prediction mode is 10011, the codeword corresponding to DIAG1 prediction mode is 10010, the codeword corresponding to DIAG2 prediction mode is 100001, the codeword corresponding to DIAG3 prediction mode is 100000, the codeword corresponding to VER prediction mode is 1011, the codeword corresponding to HOR prediction mode is 1010, the codeword corresponding to IBM0 prediction mode is 011, the codeword corresponding to IBM1 prediction mode is 0101, the codeword corresponding to IBM2 prediction mode is 0100, the codeword corresponding to ORG prediction mode is 10001, the codeword corresponding to PM0 prediction mode is 0010, the codeword corresponding to PM1 prediction mode is 0011, the codeword corresponding to PM2 prediction mode is 0000, and the codeword corresponding to PM3 prediction mode is 0001. The above are only examples of the codeword for each prediction mode, which is not limited in the embodiments of the present disclosure.

Figure 4B:
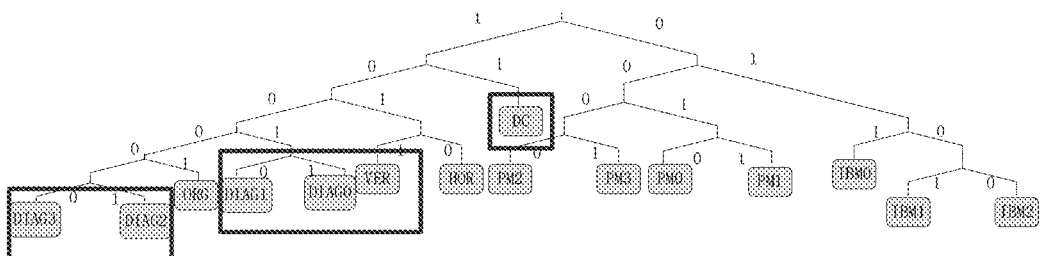

In an embodiment, when the reference pixel(s) at the upper boundary of the current block is not available and the reference pixel(s) at the left boundary of the current block is available, candidate prediction modes in the initial prediction mode list can be determined. The candidate prediction modes are prediction modes in the initial prediction mode list that the current block will not use when the reference pixel(s) at the upper boundary of the current block is not available and the reference pixel(s) at the left boundary of the current block is available. As shown in FIG. 4B, the candidate prediction modes can include DC prediction mode, DIAG0 prediction mode, DIAG1 prediction mode, DIAG2 prediction mode, DIAG3 prediction mode, and VER prediction mode.

For example, when the reference pixel of the current block is located at the upper boundary of the slice, that is, the reference pixel of the upper boundary of the current block is not available, the reference pixels of the DC prediction mode, VER prediction mode, DIAG0 prediction mode, DIAG1 prediction mode, DIAG2 prediction mode, and DIAG3 prediction mode in the intra prediction mode are not available. The prediction values of these reference pixels can be default values, such as $1<<\text{bitdepth}-1$, etc. These prediction modes are shown in FIG. 4B.

In this case, a prediction mode can be selected from DC prediction mode, VER prediction mode, DIAG0 prediction mode, DIAG1 prediction mode, DIAG2 prediction mode, and DIAG3 prediction mode as the default value mode. That is, when the prediction value of the reference pixel is the default value, this prediction mode is used for prediction. For example, the DC prediction mode can be used as the default value mode, which means that when the prediction value of the reference pixel is the default value, the DC prediction mode can be used for prediction.

In summary, the DC prediction mode can be retained and the VER prediction mode, DIAG0 prediction mode, DIAG1 prediction mode, DIAG2 prediction mode, and DIAG3 prediction mode can be removed. In this way, when the reference pixel(s) at the upper boundary is not available, the intra prediction mode can retain the DC prediction mode and HOR prediction mode, and the overflow judgment condition defaults to the DC prediction mode.

For the candidate prediction modes such as DC prediction mode, DIAG0 prediction mode, DIAG1 prediction mode, DIAG2 prediction mode, DIAG3 prediction mode, VER prediction mode, etc., the DC prediction mode can be used as the retained prediction mode, and the DIAG0 prediction mode, DIAG1 prediction mode, DIAG2 prediction mode, DIAG3 prediction mode, and VER prediction mode, etc, can be used as the target prediction modes. By removing the target prediction modes from the initial prediction mode list, the target prediction mode list can be obtained, which can be shown in FIG. 4C. The target prediction mode list corresponding to the current block can include but is not limited to: DC prediction mode, HOR prediction mode, IBM0 prediction mode, IBM1 prediction mode, IBM2 prediction mode, ORG prediction mode, PM0 prediction mode, PM1 prediction mode, PM2 prediction mode, and PM3 prediction mode.

Figure 4C:
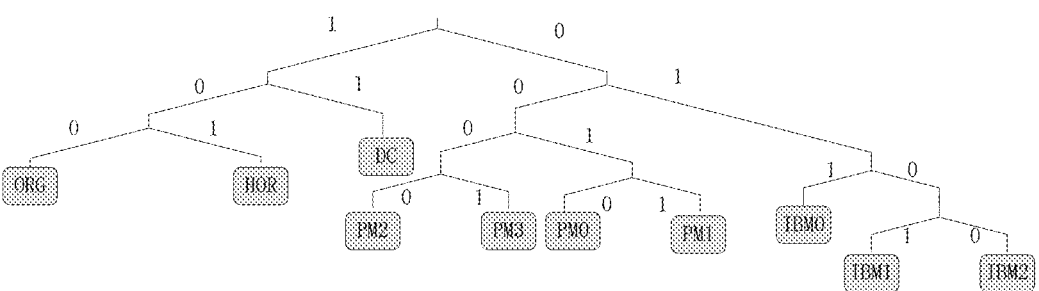

From FIG. 4C, it can be seen that the codeword corresponding to DC prediction mode is 11, the codeword corresponding to HOR prediction mode is 101, the codeword corresponding to ORG prediction mode is 100, the codeword corresponding to IBM0 prediction mode is 011, the codeword corresponding to IBM1 prediction mode is 0101, the codeword corresponding to IBM2 prediction mode is 0100, the codeword corresponding to PM0 prediction mode is 0010, the codeword corresponding to PM1 prediction mode is 0011, the codeword corresponding to PM2 prediction mode is 0000, and the codeword corresponding to PM3 prediction mode is 0001. The above are only examples of the codeword for each prediction mode, which is not limited in the embodiments of the present disclosure.

Combining FIG. 4A and FIG. 4C, it can be seen that the codeword corresponding to the HOR prediction mode has changed from 1010 to 101, and the codeword corresponding to the ORG prediction mode has changed from 10001 to 100, which reduces the codeword length and bit overhead.

Figure 4D:
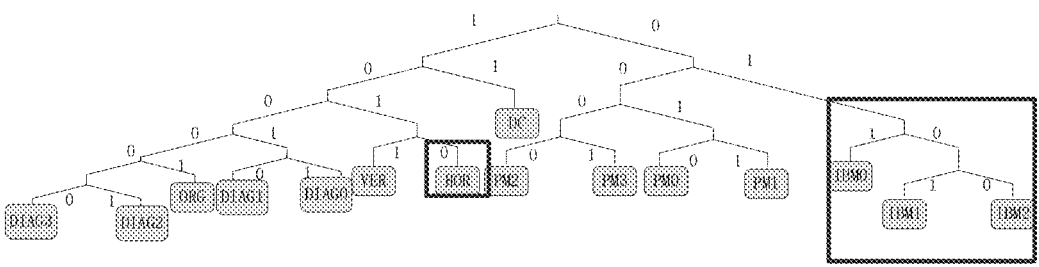

In an embodiment, when the reference pixel(s) at the left boundary of the current block is not available and the reference pixel(s) at the upper boundary of the current block is available, candidate prediction modes in the initial prediction mode list can be determined. The candidate prediction mode is the prediction mode in the initial prediction mode list that the current block will not use when the reference pixel(s) at the left boundary of the current block is not available and the reference pixel(s) at the upper boundary of the current block is available. As shown in FIG. 4D, the candidate prediction modes can include HOR prediction mode, IBM0 prediction mode, IBM1 prediction mode, and IBM2 prediction mode. For example, when the reference pixel of the current block is located at the left boundary of the slice, that is, the reference pixel of the left boundary of the current block is not available, the reference pixels of HOR prediction mode, IBM0 prediction mode, IBM1 prediction mode, and IBM2 prediction mode in the intra prediction mode are not available. The prediction values of these reference pixels can be default values, such as 1<<bitdepth−1, etc. These prediction modes are shown in FIG. 4D.

In this case, a prediction mode can be selected from HOR prediction mode, IBM0 prediction mode, IBM1 prediction mode, and IBM2 prediction mode as the default value mode, that is, when the prediction value of the reference pixel is the default value, this prediction mode can be used for prediction. For example, the HOR prediction mode can be used as the default value mode, which means that when the prediction value of the reference pixel is the default value, the HOR prediction mode can be used for prediction. In summary, the HOR prediction mode can be retained and the IBM0 prediction mode, IBM1 prediction mode, and IBM2 prediction mode can be removed. This way, when the reference pixel(s) at the left boundary is not available, the intra prediction mode can retain the HOR prediction mode as the default value mode.

For the candidate prediction modes of HOR prediction mode, IBM0 prediction mode, IBM1 prediction mode, and IBM2 prediction mode, etc., HOR prediction mode can be used as the retained prediction mode, and IBM0 prediction mode, IBM1 prediction mode, and IBM2 prediction mode, etc, can be used as the target prediction modes. By removing the target prediction modes from the initial prediction mode list (see FIG. 4A), the target prediction mode list can be obtained, and the target prediction mode list can be seen in FIG. 4E. Such that, the target prediction mode list corresponding to the current block can include but is not limited to: DC prediction mode, DIAG0 prediction mode, DIAG1 prediction mode, DIAG2 prediction mode, DIAG3 prediction mode, VER prediction mode, HOR prediction mode, ORG prediction mode, PM0 prediction mode, PM1 prediction mode, PM2 prediction mode, and PM3 prediction mode.

Figure 4E:
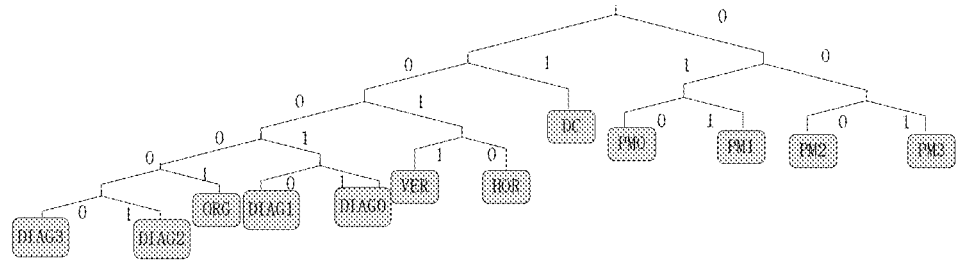

From FIG. 4E, it can be seen that the codeword corresponding to DC prediction mode is 11, the codeword corresponding to DIAG0 prediction mode is 10011, the codeword corresponding to DIAG1 prediction mode is 10010, the codeword corresponding to DIAG2 prediction mode is 100001, the codeword corresponding to DIAG3 prediction mode is 100000, the codeword corresponding to VER prediction mode is 1011, the codeword corresponding to HOR prediction mode is 1010, the codeword corresponding to ORG prediction mode is 10001, the codeword corresponding to PM0 prediction mode is 010, the codeword corresponding to PM1 prediction mode is 011, the codeword corresponding to PM2 prediction mode is 000, and the codeword corresponding to PM3 prediction mode is 001. The above are only examples of the codeword for each prediction mode, which is not limited in the embodiments of the present disclosure. Combining FIG. 4A and FIG. 4E, it can be seen that the codeword corresponding to PM0 prediction mode changes from 0010 to 010, the codeword corresponding to PM1 prediction mode changes from 0011 to 011, and the codeword corresponding to PM2 prediction mode changes from 0000 to 000, which reduces the codeword length and bit overhead.

In an embodiment, if the reference pixel(s) at the upper boundary of the current block is not available and the reference pixel(s) at the left boundary of the current block is not available, candidate prediction modes in the initial prediction mode list can be determined. The candidate prediction modes can be the prediction modes in the initial prediction mode list that the current block will not use when the reference pixel(s) at the upper boundary of the current block is not available and the reference pixel(s) at the left boundary of the current block is not available. Combined with FIG. 4B and FIG. 4D, the candidate prediction modes can include: DC prediction mode, DIAG0 prediction mode, DIAG1 prediction mode, DIAG2 prediction mode, DIAG3 prediction mode, VER prediction mode, HOR prediction mode, IBM0 prediction mode, IBM1 prediction mode, IBM1 prediction mode, and IBM2 prediction mode.

For example, if the reference pixel of the current block is located at the upper and left boundaries of the slice, that is, the reference pixel of the upper boundary of the current block is not available and the reference pixel of the left boundary of the current block is not available, the reference pixels of the DC prediction mode, VER prediction mode, DIAG0 prediction mode, DIAG1 prediction mode, DIAG2 prediction mode, and DIAG3 prediction mode in the intra prediction mode are not available, and the reference pixels of the HOR prediction mode, IBM0 prediction mode, IBM1 prediction mode, and IBM2 prediction mode are not available. The prediction values of these reference pixels can be default values, such as 1<<bitdepth−1, etc.

In this case, a prediction mode can be selected from DC prediction mode, DIAG0 prediction mode, DIAG1 prediction mode, DIAG2 prediction mode, DIAG3 prediction mode, VER prediction mode, HOR prediction mode, IBM0 prediction mode, IBM1 prediction mode, and IBM2 prediction mode as the default value mode. That is, when the prediction value of the reference pixel is the default value, this prediction mode can be used for prediction. For example, the DC prediction mode can be used as the default value mode, which means that when the prediction value of the reference pixel is the default value, the DC prediction mode can be used for prediction.

In summary, the DC prediction mode can be retained and the DIAG0 prediction mode, DIAG1 prediction mode, DIAG2 prediction mode, DIAG3 prediction mode, VER prediction mode, HOR prediction mode, IBM0 prediction mode, IBM1 prediction mode, and IBM2 prediction mode can be removed. In this way, when the reference pixel(s) at the upper boundary is not available and the reference pixel(s) at the left boundary is not available, the intra prediction mode can retain the DC prediction mode as the default value mode, and the overflow judgment condition defaults to the DC prediction mode.

For the candidate prediction modes such as DC prediction mode, DIAG0 prediction mode, DIAG1 prediction mode, DIAG2 prediction mode, DIAG3 prediction mode, VER prediction mode, HOR prediction mode, IBM0 prediction mode, IBM1 prediction mode, and IBM2 prediction mode. DC prediction mode can be used as the retained prediction mode, and DIAG0 prediction mode, DIAG1 prediction mode, DIAG2 prediction mode, DIAG3 prediction mode, VER prediction mode, HOR prediction mode, IBM0 prediction mode, IBM1 prediction mode, and IBM2 prediction mode can be used as the target prediction modes. By removing the target prediction modes from the initial prediction mode list, a target prediction mode list can be obtained, where the target prediction mode list can be seen in FIG. 4F.

Such that, the target prediction mode list corresponding to the current block can include but is not limited to: DC prediction mode, ORG prediction mode, PM0 prediction mode, PM1 prediction mode, PM2 prediction mode, and PM3 prediction mode.

Figure 4F:
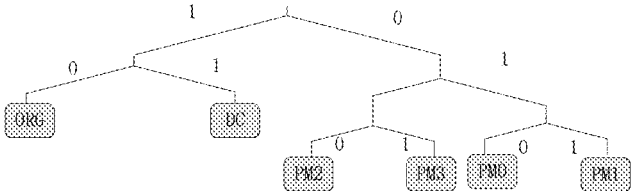

From FIG. 4F, it can be seen that the codeword corresponding to the DC prediction mode is 11, the codeword corresponding to the ORG prediction mode is 10, the codeword corresponding to the PM0 prediction mode is 010, the codeword corresponding to the PM1 prediction mode is 011, the codeword corresponding to the PM2 prediction mode is 000, and the codeword corresponding to the PM3 prediction mode is 001. The above are only examples of the codeword for each prediction mode, which is not limited in the embodiments of the present disclosure. Combining FIG. 4A and FIG. 4F, it can be seen that all the codeword lengths corresponding to ORG prediction mode, PM0 prediction mode, PM1 prediction mode, PM2 prediction mode, and PM3 prediction mode, etc, are reduced, thereby reducing bit overhead.

Embodiment 3: In Embodiments 1 and 2, DC prediction mode, DIAG0 prediction mode, DIAG1 prediction mode, DIAG2 prediction mode, DIAG3 prediction mode, VER prediction mode, HOR prediction mode, IBM0 prediction mode, IBM1 prediction mode, IBM2 prediction mode, ORG prediction mode, PM0 prediction mode, PM1 prediction mode, PM2 prediction mode, and PM3 prediction mode are involved. Where DIAG0 prediction mode, DIAG1 prediction mode, DIAG2 prediction mode, and DIAG3 prediction mode are all intra angle prediction modes; VER prediction mode is intra vertical prediction mode; HOR prediction mode is an intra horizontal prediction mode; and IBM0 prediction mode, IBM1 prediction mode, and IBM2 prediction mode are all intra block copy prediction modes. The following will explain these prediction modes based on specific application scenarios.

Figures 5A, 5B, 5C:
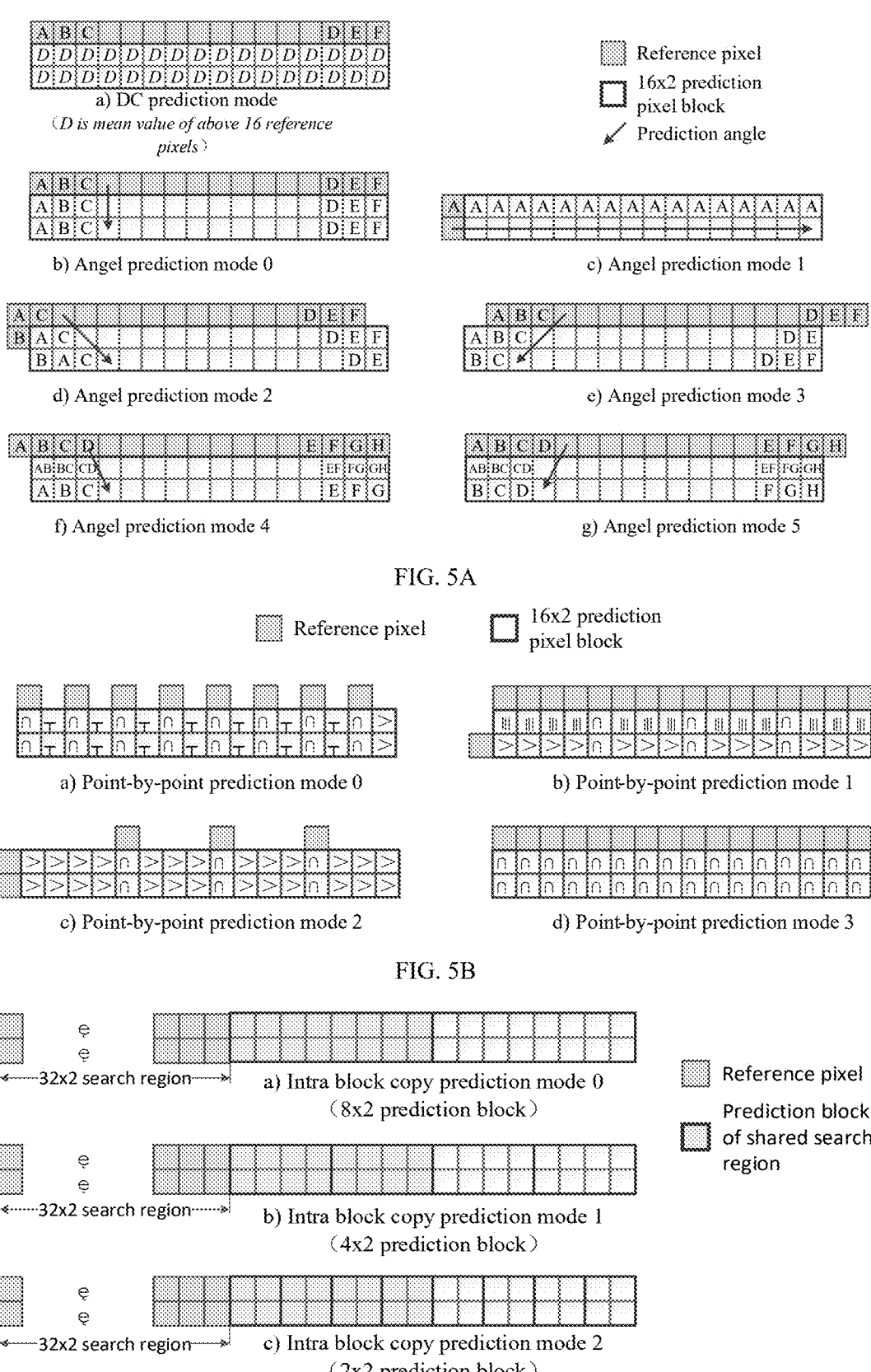
FIG. 5A is a schematic diagram of a normal intra prediction mode according to an embodiment of the present disclosure.
FIG. 5B is a schematic diagram of a point-by-point prediction mode according to embodiment of the present disclosure.
FIG. 5C is a schematic diagram of an intra block copy prediction mode according to an embodiment of the present disclosure.

For the current block of 16*2 (similar to other sizes of current blocks), as shown in FIG. 5A. FIG. 5A is a schematic diagram of the normal intra prediction mode. The normal intra prediction mode includes 7 prediction modes, including DC prediction mode and 6 angle prediction modes. For the DC prediction mode, the reference pixel at each position within the current block is D, where D is the average of the 16 reference pixels at the upper boundary of the current block. The VER prediction mode is angle prediction mode 0, and the angle corresponding to angle prediction mode 0 is shown in FIG. 5A. The reference pixels for positions in the current block can be A, B, C, . . . , D, E, F, etc., as shown in FIG. 5A. The HOR prediction mode is angle prediction mode 1, and the angle corresponding to angle prediction mode 1 is shown in FIG. 5A. The reference pixel for each position in the first row of the current block can be the left reference pixel A of the first row, and the reference pixel for each position in the second row of the current block can be the left reference pixel of the second row, as shown in FIG. 5A. The DIAG0 prediction mode is angle prediction mode 2, and the angle corresponding to angle prediction mode 2 is shown in FIG. 5A. Based on this angle, the reference pixel for each position within the current block can be obtained, as shown in FIG. 5A. The DIAG1 prediction mode is angle prediction mode 3, and the angle corresponding to angle prediction mode 3 is shown in FIG. 5A. Based on this angle, the reference pixel for each position within the current block can be obtained, as shown in FIG. 5A. The DIAG2 prediction mode is angle prediction mode 4, and the angle corresponding to angle prediction mode 4 is shown in FIG. 5A. Based on this angle, the reference pixel for each position within the current block can be obtained, as shown in FIG. 5A. The DIAG3 prediction mode is angle prediction mode 5, and the angle corresponding to angle prediction mode 5 is shown in FIG. 5A. Based on this angle, the reference pixel for each position within the current block can be obtained, as shown in FIG. 5A. In FIG. 5A, XY represents the pixel average of reference pixel X and reference pixel Y.

For the current block of 16*2 (similar to other sizes of current blocks), as shown in FIG. 5B, FIG. 5B is a schematic diagram of the point-by-point prediction mode. There are four prediction modes for the point-by-point prediction mode, including PM0 prediction mode, PM1 prediction mode, PM2 prediction mode, and PM3 prediction mode. In FIG. 5B, PM0 prediction mode is point-by-point prediction mode 0, PM1 prediction mode is point-by-point prediction mode 1, PM2 prediction mode is point-by-point prediction mode 2, and PM3 prediction mode is point-by-point prediction mode 3.

In FIG. 5B, $\equiv$ represents the prediction value of the current pixel obtained by averaging the reconstruction values of the left and right pixels; $\|$ represents the prediction value of the current pixel obtained by averaging the reconstruction values of the upper and lower pixels; > represents that the reconstruction value of the left pixel is directly used as the prediction value of the current pixel; and $\vee$ represents that the reconstruction value of the upper pixel is directly used as the prediction value for the current pixel.

For the current block of 16*2 (similar to current blocks of other sizes), as shown in FIG. 5C, FIG. 5C is a schematic diagram of the IBC (Intra Block Copy) prediction mode. There are three prediction modes for intra block copy prediction, including IBM0 prediction mode, IBM1 prediction mode, and IBM2 prediction mode. In FIG. 5C, the IBM0 prediction mode is intra block copy prediction mode 0. For intra block copy prediction mode 0, the current block of 16*2 can be split into two 8*2 prediction blocks, and the prediction values of each 8*2 prediction block can be determined based on the reference pixels in the left 32*2 search region. The IBM1 prediction mode is intra block copy prediction mode 1. For intra block copy prediction mode 1, the current block of 1*2 can be split into four 4*2 prediction blocks, and the prediction values of each 4*2 prediction block can be determined based on the reference pixels in the left 32*2 search region. The IBM2 prediction mode is intra block copy prediction mode 2. For intra block copy prediction mode 2, the current block of 16*2 can be split into eight 2*2 prediction blocks, and the prediction values of each 2*2 prediction block can be determined based on the reference pixels in the left 32*2 search region.

For the current block of 16*2 (similar to other sizes of current blocks), the ORG prediction mode means using the original pixel values, without referencing the reference pixels at the upper boundary of the current block or the left boundary of the current block, which will not be further elaborated.

In an embodiment, for cases where prediction values cannot be obtained for the boundary, a default value is generally used as padding, where the default value is usually 1<<(bitdepth−1) or (1<<(bitdepth−1)−1). When the picture bit width is 8, the bit depth is equal to 8, that is, the default value for padding is 128 or 127. Padding with a single default value can result in identical prediction values across multiple prediction modes. Therefore, during the encoding process, some modes cannot be selected, leading to encoding redundancy.

For the above findings, an encoding and decoding method is proposed in the embodiments of the present disclosure. For the encoding unit (such as the current block) at the boundary, the encoded reconstruction block can be used to derive as many different reference pixels as possible on certain predictions. Adding more reference pixel padding schemes ensures that the prediction mode that cannot be selected under a single default value padding may be selected after padding with other reference pixels. For example, for different prediction modes, when the upper boundary is not available and the left boundary is available, the reference pixels of the upper boundary are derived from the reconstruction values of the left block. When the upper boundary is available and the left boundary is not available, the reference pixels of the left boundary are derived from the reconstruction values of the upper block. For different prediction modes, the deriving method can be different.

The following provides a detailed explanation of the encoding and decoding method in the embodiments of the present disclosure, based on several embodiments.

Embodiment 4: the embodiments of the present disclosure propose an encoding and decoding method that can be applied to both the decoding device (also known as a video decoder) and the encoding device (also known as a video encoder). For the decoding device, the encoding and decoding method can be a decoding method, and for the encoding device, the encoding and decoding method can be an encoding method.

As shown in FIG. 6, the flowchart of the encoding and decoding method, the method can include steps 601 to 602.

In step 601, when the reference pixels of the first boundary of the current block are not available and the reference pixels of the second boundary of the current block are available, the reference pixels of the first boundary can be filled based on the reference pixels of the second boundary.

In step 602, the current block is encoded or decoded based on the filled reference pixels of the first boundary and the reference pixels of the second boundary.

For example, for the decoding device, the current block can be decoded based on the filled reference pixels of the first boundary and the reference pixels of the second boundary, without any restrictions on the decoding process. For example, for the encoding device, the current block can be encoded based on the filled reference pixels of the first boundary and the reference pixels of the second boundary, without any restrictions on the encoding process.

For example, the first boundary can be the left boundary, and the second boundary can be the upper boundary. Therefore, when the reference pixels at the left boundary of the current block are not available and the reference pixels at the upper boundary of the current block are available, the reference pixels at the left boundary can be filled based on the reference pixels at the upper boundary, and the current block can be encoded or decoded based on the reference pixels at the left boundary and the reference pixels at the upper boundary.

For example, the first boundary can be the upper boundary, and the second boundary can be the left boundary. Therefore, when the reference pixels of the upper boundary of the current block are not available and the reference pixels of the left boundary of the current block are available, the reference pixels of the upper boundary can be filled based on the reference pixels of the left boundary, and the current block can be encoded or decoded based on the reference pixels of the left boundary and the reference pixels of the upper boundary.

In an embodiment, when the reference pixels at the first boundary of the current block are not available and the reference pixels at the second boundary of the current block are available, filling the reference pixels at the first boundary based on the reference pixels at the second boundary may include but is not limited to: when the prediction mode corresponding to the current block is a point-by-point prediction mode, the reference pixels at the upper boundary of the current block are not available, and the reference pixels at the left boundary of the current block are available, each of the reference pixels at the upper boundary can be filled with the first value of the reference pixels at the left boundary; in addition, when the reference pixels at the left boundary of the current block are not available and the reference pixels at the upper boundary of the current block are available, the reference pixels at the left boundary can be filled with the first value of the reference pixels at the upper boundary.

In an embodiment, when the reference pixels at the first boundary of the current block are not available and the reference pixels at the second boundary of the current block are available, filling the reference pixels at the first boundary based on the reference pixels at the second boundary may include but is not limited to: when the prediction mode corresponding to the current block is a point-by-point prediction mode, the reference pixels at the upper boundary of the current block are not available, and the reference pixels at the left boundary of the current block are available, the reference pixels of the upper boundary can be filled with the reconstruction values of corresponding prediction positions of the first row of the encoding block at the left boundary; in addition, when the reference pixels at the left boundary of the current block are not available and the reference pixels at the upper boundary of the current block are available, the reference pixels at the left boundary can be filled with the first value of the reference pixels at the upper boundary.

In an embodiment, when the reference pixels of the first boundary of the current block are not available and the reference pixels of the second boundary of the current block are available, filling the reference pixels of the first boundary based on the reference pixels of the second boundary may include but is not limited to: when the prediction mode corresponding to the current block is an intra prediction mode other than DC prediction mode, and the reference pixels of the upper boundary of the current block are not available and the reference pixels of the left boundary of the current block are available, the reference pixels of the upper boundary are filled with the reconstruction values of corresponding prediction positions of the first row of the encoding block of the left boundary; when the reference pixels at the left boundary of the current block are not available and the reference pixels at the upper boundary of the current block are available, the reference pixels at the left boundary are filled with the reference pixel values of corresponding positions of the first row of the upper boundary.

In an embodiment, when the reference pixels of the first boundary of the current block are not available and the reference pixels of the second boundary of the current block are available, filling the reference pixels of the first boundary based on the reference pixels of the second boundary may include but is not limited to: when the prediction mode corresponding to the current block is intra prediction mode, and the reference pixels of the upper boundary are not available and the reference pixels of the left boundary are available, the reference pixels of the upper boundary are filled with the reconstruction values of the corresponding prediction positions of the first row of the encoding block of the left boundary; when the reference pixels at the left boundary are not available and the reference pixels at the upper boundary are available, the reference pixels at the left boundary are filled with default values.

In an embodiment, when the reference pixels of the first boundary of the current block are not available and the reference pixels of the second boundary of the current block are not available, the target prediction mode in the initial prediction mode list corresponding to the current block can be removed to obtain a target prediction mode list, and the current block can be encoded or decoded based on the target prediction mode list.

For example, the initial prediction mode list can include multiple prediction modes, and the target prediction mode is a prediction mode in the initial prediction mode list that the current block will not use when the reference pixel is not available.

For example, removing the target prediction mode from the initial prediction mode list corresponding to the current block can include but is not limited to: determining multiple candidate prediction modes in the initial prediction mode list, where the candidate prediction mode is a prediction mode in the initial prediction mode list that is not used for the current block when the reference pixel is not available; selecting at least one prediction mode from all candidate prediction modes as the first target prediction mode; and removing the first target prediction mode from the initial prediction mode list. For example, selecting at least one prediction mode from all candidate prediction modes as the first target prediction mode may include: based on the length of the codeword corresponding to each candidate prediction mode, selecting K candidate prediction modes from all candidate prediction modes as the retained prediction modes, where K is a positive integer; and determining a candidate prediction mode other than the retained prediction mode as the first target prediction mode.

When the reference pixels of the first boundary are not available and the reference pixels of the second boundary are not available, candidate prediction modes include: DC prediction mode, DIAG0 prediction mode, DIAG1 prediction mode, DIAG2 prediction mode, DIAG3 prediction mode, VER prediction mode, HOR prediction mode, IBM0 prediction mode, IBM1 prediction mode, and IBM2 prediction mode; and the first target prediction modes include: DIAG0 prediction mode, DIAG1 prediction mode, DIAG2 prediction mode, DIAG3 prediction mode, VER prediction mode, HOR prediction mode, IBM0 prediction mode, IBM1 prediction mode, and IBM2 prediction mode.

For example, removing the target prediction mode from the initial prediction mode list corresponding to the current block can include but is not limited to: determining a second target prediction mode in the initial prediction mode list, where the second target prediction mode in the initial prediction mode list is a prediction mode that the current block will not use when the reference pixel is not available; and removing the second target prediction mode from the initial prediction mode list.

For example, when the reference pixel of the first boundary of the current block is not available and the reference pixel of the second boundary of the current block is not available, which means that the reference pixel of the upper boundary of the current block is not available and the reference pixel of the left boundary of the current block is not available. In this case, the processing procedure can refer to Embodiments 1-3, and there is no limitation on this processing procedure.

From the above technical solutions, it can be seen that in the embodiments of the present disclosure, for the current block located at the boundary (i.e., the reference pixels at the left boundary are not available or the reference pixels at the upper boundary are not available), the encoded reconstruction block is used to derive as many different reference pixels as possible. Based on the reconstruction block, reconstruction values that cannot be obtained by different prediction modes can be derived, and more reference pixel padding schemes can be added, such that the mode that cannot be selected under a single default value padding may be selected after padding with other reference pixels. It can remove coding redundancy, improve coding efficiency, effectively fill the reference pixels at the boundary, enhance the prediction ability of the prediction mode at the boundary position, thereby improving the quality of the reconstructed picture at the boundary, and enhancing coding and decoding performance.

Embodiment 5: For Embodiment 4, when the pixels outside the slice boundary are not available, for the encoding unit (such as the current block) at the boundary, more reference pixel padding schemes can be added using the encoded reconstruction block. For different prediction modes, when the upper boundary is not available and the left boundary is available, the reference pixels at the upper boundary are derived from the reconstruction values of the left block. When the upper boundary is available and the left boundary is not available, the reference pixels at the left boundary are derived from the reconstruction values of the upper block. The following reference pixel padding schemes are provided.

Scenario 1: For the prediction mode corresponding to the current block being a point-by-point prediction mode, when the reference pixels at the upper boundary of the current block are not available and the reference pixels at the left boundary of the current block are available, the reference pixels at the upper boundary can be filled with the first value "A" of the reference pixels at the left boundary, as shown in FIG. 7A. When the reference pixels at the left boundary of the current block are not available, and the reference pixels at the upper boundary of the current block are available, then the reference pixels at the left boundary can be filled with the first value of the reference pixels at the upper boundary. As shown in FIG. 7A, the reference pixels at the left boundary of the current block can be filled with the first value "A" of the reference pixels at the upper boundary.

In FIG. 7A, the lowercase letter "a" represents the reference pixel of the upper boundary of the current block or the reference pixel of the left boundary of the current block, and the uppercase letter "A" represents the reconstructed pixel value of the left boundary of the current block or the reconstructed pixel value of the upper boundary of the current block. When the reference pixel a at the upper boundary of the current block is not available, the reference pixel a at the upper boundary of the current block can be replaced with the reconstructed pixel value A at the left boundary of the current block. Alternatively, when the reference pixel a at the left boundary of the current block is not available, the reference pixel a at the left boundary of the current block can be replaced with the reconstructed pixel value A at the upper boundary of the current block.

Scenario 2: For the prediction mode corresponding to the current block being a point-by-point prediction mode, when the reference pixel of the upper boundary of the current block is not available and the reference pixel of the left boundary of the current block is available, the reference pixels of the upper boundary can be filled with the reconstruction values of the corresponding prediction positions of the first row of the encoding block at the left boundary. As shown in FIG. 7B, the upper boundary of the current block corresponds to 16 reference pixels, and the reconstruction values of the 16 prediction positions are selected from the first row of the encoding block at the left boundary. The first reference pixel a of the upper boundary is filled with the reconstruction value A of the first prediction position of the encoding block at the left boundary, . . . , and the third reference pixel b of the upper boundary is filled with the reconstruction value B of the third prediction position of the encoding block at the left boundary, . . . , the 5th reference pixel c at the upper boundary is filled with the reconstruction value C of the 5th prediction position in the encoding block at the left boundary, . . . , the 15th reference pixel h at the upper boundary is filled with the reconstruction value H of the 15th prediction position in the encoding block at the left boundary.

When the reference pixel at the left boundary of the current block is not available, and the reference pixel outside the upper boundary of the current block is available, the reference pixels at the left boundary can be filled with the first value of the reference pixels at the upper boundary. As shown in FIG. 7A, the reference pixels at the left boundary of the current block are filled with the first value "A" of the reference pixels at the upper boundary. Alternatively, when the reference pixel at the left boundary of the current block is not available and the reference pixel outside the upper boundary of the current block is available, the reference pixel at the left boundary can be filled with the reference pixel value at the corresponding position on the first row of the upper boundary. As shown in FIG. 7B, the first reference pixel at the left boundary of the current block is filled with the first value "A" at the upper boundary, and the second reference pixel at the left boundary of the current block is filled with the second value "B" at the upper boundary.

In FIG. 7B, lowercase letters "a, b" represent the reference pixels at the upper boundary or left boundary of the current block, and uppercase letters "A. B" represent the reconstructed pixel values at the left boundary or upper boundary of the current block. When the reference pixels a and b at the upper boundary of the current block are not available, the reference pixels a and b at the upper boundary of the current block can be replaced with the reconstructed pixel values A and B at the left boundary of the current block. Alternatively, when the reference pixels a and b at the left boundary of the current block is not available, the reference pixels a and b at the left boundary of the current block can be replaced with the reconstructed pixel values A and B at the upper boundary of the current block. There are also lowercase letters such as c, d, e, f, and uppercase letters such as C, D, E, F.

Scenario 3: for the prediction mode corresponding to the current block being an intra prediction mode other than the DC prediction mode, that is, for the intra prediction mode (excluding the DC prediction mode), when the reference pixel of the upper boundary of the current block is not available and the reference pixel of the left boundary of the current block is available, the reference pixel of the upper boundary can be filled with the reconstruction value of the corresponding prediction position of the first row of the encoding block at the left boundary. As shown in FIG. 7C, the upper boundary of the current block corresponds to 16 reference pixels, and the reconstruction values of 16 prediction positions can be selected from the first row of the encoding block at the left boundary. The first reference pixel of the upper boundary is filled with the reconstruction value of the first prediction position of the encoding block at the left boundary, and the second reference pixel of the upper boundary is filled with the reconstruction value of the second prediction position of the encoding block at the left boundary, . . . , and so on, the 16th reference pixel outside the upper boundary is filled with the reconstruction value of the 16th prediction position in the encoding block at the left boundary.

When the reference pixel at the left boundary of the current block is not available, and the reference pixel outside the upper boundary of the current block is available, the reference pixel at the left boundary can be filled with the reference pixel value at the corresponding position of the first row of the upper boundary. As shown in FIG. 7D, there are two reference pixels at the left boundary of the current block. Therefore, the first reference pixel at the left boundary of the current block is filled with the reference pixel value at the first position of the first row of the upper boundary, and the second reference pixel at the left boundary of the current block is filled with the reference pixel value at the second position of the first row of the upper boundary. Alternatively, when the reference pixel at the left boundary of the current block is not available, and the reference pixel outside the upper boundary of the current block is available, the reference pixels at the left boundary can be filled with the first value of the reference pixels at the upper boundary.

For example, in scenario 3, the scheme of padding with (1<<(bitdepth−1)) as the default value can be retained. Therefore, when the reference pixel outside the upper boundary of the current block is not available, the DC prediction mode can be retained.

Scenario 4: for the prediction mode corresponding to the current block being the intra prediction mode (not excluding the DC prediction mode), when the reference pixel of the upper boundary of the current block is not available and the reference pixel of the left boundary of the current block is available, the reference pixel of the upper boundary can be filled with the reconstruction value of the corresponding prediction position of the first row of the encoding block at the left boundary. For example, the upper boundary of the current block corresponds to 16 reference pixels, and the reconstruction values of 16 prediction positions can be selected from the first row of the encoding block at the left boundary. The first reference pixel of the upper boundary is filled with the reconstruction value of the first prediction position of the encoding block at the left boundary, and the second reference pixel of the upper boundary is filled with the reconstruction value of the second prediction position of the encoding block at the left boundary, . . . , and the 16th reference pixel outside the upper boundary is filled with the reconstruction value of the 16th prediction position in the encoding block at the left boundary.

When the reference pixel at the left boundary of the current block is not available, and the reference pixel outside the upper boundary of the current block is available, the reference pixels at the left boundary can be filled with the default value. For example, all the reference pixels at the left boundary are filled with $1 \ll (bitdepth-1)$. $1 \ll (bitdepth-1)$ is just an example of the default value, which is not limited and can be configured arbitrarily. Due to the need to retain $(1 \ll (bitdepth-1))$ as the default padding value, the horizontal prediction value can be kept unchanged.

In an embodiment, for cases where prediction values cannot be obtained for the boundary, a default value is generally used as padding, where the default value is usually $1 \ll (bitdepth-1)$ or $(1 \ll (bitdepth-1)-1)$. When the picture bit width is 8, the bit depth is equal to 8, that is, the default value for padding is 128 or 127. Padding with a single default value can result in identical prediction values across multiple prediction modes. Therefore, during the encoding process, some modes cannot be selected, leading to encoding redundancy.

For the above findings, the embodiments of the present disclosure propose an encoding and decoding method. For the encoding unit (current block) at the boundary, when the IBC mode is used in the current block, such as IBM0 prediction mode, IBM1 prediction mode, IBM2 prediction mode, the encoded reconstruction block can be used to derive as many different reference pixels as possible and add more reference pixel padding schemes.

The following provides a detailed explanation of the encoding and decoding method in the embodiments of the present disclosure, based on several embodiments.

Embodiment 6: the embodiments of the present disclosure propose an encoding and decoding method that can be applied to both the decoding device (also known as a video decoder) and the encoding device (also known as a video encoder). For the decoding device, the encoding and decoding method can be a decoding method, and for the encoding device, the encoding and decoding method can be an encoding method. As shown in FIG. 8A, which is a flowchart of the encoding and decoding method, when the current block enables intra block copy prediction mode, the method may include steps 801 to 802.

In step 801, when the reference pixels at the left boundary of the current block are not available and the reference pixels outside the upper boundary of the current block are available, the first search region corresponding to the first sub block of the current block is determined based on the reconstructed pixels at the upper boundary, and reconstructed pixels of the first sub block of the current block are determined based on reference pixels of the first search region.

Step 802: After obtaining the reconstructed pixels of the first sub block, a second search region corresponding to a second sub block of the current block is determined based on reconstructed pixels of the upper boundary of the current block and/or the reconstructed pixels of the first sub block of the current block, and reconstructed pixels of the second sub block of the current block is determined based on the reference pixels of the second search region.

For example, the current block is split into the first sub block and the second sub block.

For example, for the encoding device, in the encoding process, the current block can be split into first sub block and second sub block. The first search region corresponding to the first sub block of the current block can be determined based on the reconstructed pixels of the upper boundary, and the reconstructed pixels of the first sub block of the current block can be determined based on the reference pixels of the first search region. The second search region corresponding to the second sub block of the current block can be determined based on the reconstructed pixels of the upper boundary and/or the reconstructed pixels of the first sub block of the current block, and the reconstructed pixels of the second sub block of the current block can be determined based on the reference pixels of the second search region.

For example, for the decoding device, in the decoding process, the current block can be split into a first sub block and a second sub block. The first search region corresponding to the first sub block of the current block can be determined based on the reconstructed pixels at the upper boundary, and the reconstructed pixels of the first sub block of the current block can be determined based on the reference pixels of the first search region. The second search region corresponding to the second sub block of the current block can be determined based on the reconstructed pixels at the upper boundary and/or the reconstructed pixels of the first sub block of the current block, and the reconstructed pixels of the second sub block of the current block can be determined based on the reference pixels of the second search region.

In an embodiment, determining the reconstructed pixels of the first sub block based on the reference pixels of the first search region may include, but is not limited to, splitting the first sub block into M first prediction blocks, where M is a positive integer, and determining the reconstructed pixels of each first prediction block based on the reference pixels of the first search region. In addition, determining the reconstructed pixels of the second sub block based on the reference pixels of the second search region may include but is not limited to: splitting the second sub block into N second prediction blocks, where N is a positive integer, and determining the reconstructed pixels of each second prediction block based on the reference pixels of the second search region.

For example, the size of the second prediction block may be the same as the size of the first prediction block; or the size of the second prediction block may be different from the size of the first prediction block. For example, if the size of the current block is 16*2, the sizes of both the first and second sub block are 8*2, then; the size of the first prediction block is 2*1, and the size of the second prediction block is 2*1 or 2*2; or the size of the first prediction block is 4*1, and the size of the second prediction block is 4*1 or 4*2; or the size of the first prediction block is 8*1, and the size of the second prediction block is 8*1 or 8*2. The above are just a few examples and are not limiting.

In an embodiment, determining the first search region corresponding to the first sub block of the current block based on the reconstructed pixels of the upper boundary may include but is not limited to: filling the complete region of the first designated region on the left side of the current block based on the reconstructed pixels of the first row of the upper boundary, and determining the complete region of the first designated region as the first search region corresponding to the first sub block; alternatively, based on the reconstructed pixels in the first row of the upper boundary, filling a partial region of the first designated region on the left side of the current block, and determining the partial region of the first designated region as the first search region corresponding to the first sub block.

In an embodiment, determining the first search region corresponding to the first sub block of the current block based on the reconstructed pixels of the upper boundary may include but is not limited to: determining the reconstructed pixels of the upper boundary as the first search region corresponding to the first sub block of the current block. The reconstructed pixels of the upper boundary may include: reconstructed pixels of the first row of the upper boundary; or the reconstructed pixels in the first row of the upper boundary and the reconstructed pixels in the second row of the upper boundary; where the length of the reconstructed pixels at the upper boundary can be equal to the width of the current block; or the length of the reconstructed pixels at the upper boundary can be greater than the width of the current block.

In an embodiment, determining the second search region corresponding to the second sub block of the current block based on the reconstructed pixels of the upper boundary and/or the reconstructed pixels of the first sub block may include but is not limited to: filling the complete region of the second designated region on the left side of the second sub block based on the reconstructed pixels of the first row of the upper boundary and the reconstructed pixels of the first sub block, and determining the complete region of the second designated region as the second search region corresponding to the second sub block; or based on the reconstructed pixels of the first row of the upper boundary and the reconstructed pixels of the first sub block, filling a partial region of the second designated region on the left side of the second sub block, and determining the partial region of the second designated region as the second search region corresponding to the second sub block.

In an embodiment, determining the second search region corresponding to the second sub block of the current block based on the reconstructed pixels of the upper boundary and/or the reconstructed pixels of the first sub block may include but is not limited to: determining the reconstructed pixels of the upper boundary as the second search region corresponding to the second sub block; or determining the reconstructed pixels of the first sub block as the second search region corresponding to the second sub block. Alternatively, the reconstructed pixels of the upper boundary and the reconstructed pixels of the first sub block can be determined as the second search region corresponding to the second sub block, that is, the second search region includes both the reconstructed pixels of the upper boundary and the reconstructed pixels of the first sub block. The reconstructed pixels of the upper boundary may include: reconstructed pixels of the first row of the upper boundary; or the reconstructed pixels in the first row of the upper boundary and the reconstructed pixels in the second row of the upper boundary; where the length of the reconstructed pixels at the upper boundary can be equal to the width of the current block; or the length of the reconstructed pixels at the upper boundary can be greater than the width of the current block.

In an embodiment, when the reference pixel outside the upper boundary of the current block is not available and the reference pixel at the left boundary of the current block is not available, the target prediction mode in the initial prediction mode list corresponding to the current block can be removed to obtain a target prediction mode list, and the current block can be encoded or decoded based on the target prediction mode list.

For example, the initial prediction mode list can include multiple prediction modes, and the target prediction mode is a prediction mode in the initial prediction mode list that the current block will not use when the reference pixel is not available.

For example, removing the target prediction mode from the initial prediction mode list corresponding to the current block can include but is not limited to: determining multiple candidate prediction modes in the initial prediction mode list, where the candidate prediction mode is a prediction mode in the initial prediction mode list that is not used for the current block when the reference pixel is not available; selecting at least one prediction mode from all candidate prediction modes as the first target prediction mode; and removing the first target prediction mode from the initial prediction mode list.

Selecting at least one prediction mode from all candidate prediction modes as the first target prediction mode may include: based on the length of the codeword corresponding to each candidate prediction mode, selecting K candidate prediction modes from all candidate prediction modes as the retained prediction modes, where K is a positive integer; and determining a candidate prediction mode other than the retained prediction mode as the first target prediction mode.

For example, the reference pixel of the upper boundary of the current block is not available and the reference pixel of the left boundary of the current block is not available. In this case, the processing procedure can refer to Embodiments 1-3, and there is no limitation on this processing procedure.

From the above technical solutions, it can be seen that in the embodiments of the present disclosure, for the IBC mode, for the current block at the boundary (i.e., the reference pixels at the left boundary are not available), using the reconstruction block at the upper boundary, more different reference pixels are derived as much as possible, and more reference pixel padding schemes are added, which can remove coding redundancy, improve coding efficiency, effectively fill the reference pixels at the boundary, enhance the prediction ability of the prediction mode at the boundary position, thereby improving the quality of the reconstructed picture at the boundary, and enhancing coding and decoding performance.

Embodiment 7: For the current block of 16*2 (similar to current blocks of other sizes), as shown in FIG. 5C. FIG. 5C is a schematic diagram of the intra block copy prediction mode. There are three prediction modes for intra block copy prediction mode, namely intra block copy prediction mode 0, intra block copy prediction mode 1, and intra block copy prediction mode 2. For example, for intra block copy prediction mode 0 the current block of 16*2 can be vertically split into two 8*2 prediction blocks, and the prediction value of each 8*2 prediction block can be determined based on the reference pixels in the left 32*2 search region. For intra block copy prediction mode 1, the current block of 16*2 can be vertically split into four 4*2 prediction blocks, and the prediction value of each 4*2 prediction block can be determined based on the reference pixels in the left 32*2 search region. For intra block copy prediction mode 2, the current block of 16*2 can be vertically split into eight 2*2 prediction blocks, and the prediction value of each 2*2 prediction block can be determined based on the reference pixels in the left 32*2 search region.

In an embodiment, when the reference pixels of the 32*2 search region on the left side of the current block are not available, the 32*2 search region can be filled with 1<< (bitdepth−1) by default, and the prediction value of each prediction block can be determined based on the filled 32*2 search region. For the 16*2 pixel block in the first column of Slice, intra block copy prediction mode cannot be performed. The intra block copy prediction mode is based on three channel shared mode information and BV (Block Vector, representing the position of the copy block in the search region).

In an embodiment, the current block can be split into a first sub block and a second sub block. If the size of the current block is 16*2, the size of the first sub block is 8*2, and the size of the second sub block is 8*2. When the current block is of other sizes, it can also be vertically split into a first sub block and a second sub block.

For the first sub block, when the reference pixel at the left boundary of the current block is not available and the reference pixel outside the upper boundary of the current block is available (e.g., when the upper boundary of the current block does not belong to the picture boundary or slice boundary), the first search region corresponding to the first sub block of the current block can be filled based on the reconstructed pixels at the upper boundary (e.g., the reconstructed pixels on the first row of the upper boundary).

For example, the reconstructed pixels of the first row of the upper boundary can be used to fill the complete region of the first designated region on the left side of the current block, and the complete region of the first designated region can be determined as the first search region. Assuming the size of the current block is 16*2, that is, the first row of reconstructed pixels at the upper boundary of the current block is 16*1, and the first designated region is 32*2 on the left side of the current block. Based on this, the complete region of the first designated region on the left side of 32*2 can be filled based on the reconstructed pixels of 16*1 on the first row of the upper boundary, and the complete region of the first designated region can be used as the first search region. For example, the 16*1 reconstructed pixels of the first row of the upper boundary can be copied twice in the first row of the first designated region, and the 16*1 reconstructed pixels of the first row of the upper boundary can be copied twice in the second row of the first designated region. For example, the reconstructed pixels of 16*1 in the first row of the upper boundary is copied twice in the first row of first designated region, and the second row of the first designated region is filled with 32 default values. For example, the first row of the first designated region is filled with 32 default values, and the reconstructed pixels of 16*1 in the first row of the upper boundary are copied twice in the second row of the first designated region. For example, the first row of the first designated region is first filled with 16 default values, and then the 16*1 reconstructed pixels in the first row of the upper boundary are copied in the first row of the first designated region; and the 16*1 reconstructed pixels in the first row of the upper boundary are copied twice in the second row of the first designated region. For example, in the first row of the first designated region, 16 default values are embedded first, and then the 16*1 reconstructed pixels in the first row of the upper boundary are copied; and in the second row of the first designated region, 16 default values are embedded first, and then the 16*1 reconstructed pixels in the first row of the upper boundary are copied. For example, in the first row of the first designated region, the 16*1 reconstructed pixels in the first row of the upper boundary are copied first, and then 16 default values are embedded; and in the second row of the first designated region, the 16*1 reconstructed pixels in the first row of the upper boundary are copied first, and then 16 default values are embedded. The above are just a few examples, and there is no limitation in this embodiment as long as the complete region of the first designated region can be filled based on the reconstructed pixels of the first row of the upper boundary, and the complete region of the first designated region can be used as the first search region.

For example, a partial region of the first designated region on the left side of the current block can be filled based on reconstructed pixels of the first row of the upper boundary, and this partial region of the first designated region can be determined as the first search region. Assuming the size of the current block is 16*2, that is, the first row of reconstructed pixels at the upper boundary of the current block is 16*1, and the first designated region is a 32*2 region on the left side of the current block. Based on this, a partial region of the 32*2 first designated region on the left side can be filled based on the 16*1 reconstructed pixels on the first row of the upper boundary. That is, when the search region cannot meet the specified search range, the search region can be directly reduced.

For example, a partial region of the first designated region can be a 16*2 region on the left side of the current block. The 16*1 reconstructed pixels of the first row of the upper boundary are copied in the first row of the first designated region, and the 16*1 reconstructed pixels of the first row of the upper boundary are copied in the second row of the first designated region. Alternatively, the reconstructed pixels of 16*1 in the first row of the upper boundary is copied in the first row of first designated region, and the second row of the first designated region is filled with 16 default values. Alternatively, the first row of the first designated region is filled with 16 default values, and the reconstructed pixels of 16*1 in the first row of the upper boundary are copied in the second row of the first designated region. Alternatively, the first row of the first designated region is first filled with 8 default values, then the first 8 reconstructed pixels of the upper boundary are copied in the first row of the first designated region; and the second row of the first designated region is first filled with 8 default values, and then the last 8 reconstructed pixels of the upper boundary are copied in the second row of the first designated region. The above are just a few examples, and this embodiment is not limited to this. As long as the 16*2 region of the first designated region can be filled based on the reconstructed pixels of the first row of the upper boundary.

For example, a partial region of the first designated region can be an 8*2 region on the left side of the current block. The first 8 reconstructed pixels of the first row of the upper boundary are copied in the first row of the first designated region, and the last 8 reconstructed pixels of the first row of the upper boundary are copied in the second row of the first designated region. The above is only an example and is not limited in this embodiment.

For example, a partial region of the first designated region can be a 24*2 region on the left side of the current block. The first row of the first designated region is filled with 8 default values, and then the 16*1 reconstructed pixels of the first row of the upper boundary are copied in the first row of the first designated region; and the second row of the first designated region is filled with 8 default values, and then the 16*1 reconstructed pixels of the first row of the upper boundary are copied in the second row of the first designated region. Alternatively, in the first row of the first designated region, the first 8 reconstructed pixels of the first row of the upper boundary are copied, then the 16*1 reconstructed pixels of the first row of the upper boundary are copied in the first row of the first designated region; and the last 8 reconstructed pixels of the first row of the upper boundary are copied in the second row of the first designated region, and then the 16*1 reconstructed pixels of the first row of the upper boundary are copied in the second row of the first designated region. The above are just a few examples, and this embodiment is not limited to this. As long as the 24*2 region of the first designated region can be filled based on the reconstructed pixels of the first row of the upper boundary.

For example, after the first search region corresponding to the first sub block is filled based on reconstructed pixels at the upper boundary, the reconstructed pixels of the first sub block can be determined based on the reference pixels of the first search region. For example, the reconstructed pixels of the first sub block can be determined based on the reference pixels of the first search region (such as a 32*2 search region or a 24*2 search region, etc.).

For example, the first sub block can be split into M first prediction blocks, where M can be a positive integer, and the reconstructed pixels for each first prediction block can be determined based on the reference pixels in the first search region. For example, for each first prediction block, a reference block that matches the first prediction block can be found from the first search region, and the size of the reference block is the same as the size of the first prediction block. Based on this reference block, the reconstructed pixels of the first prediction block can be determined.

For example, the process of finding a reference block that matches the first prediction block from the first search region can also be referred to as the BV (Block Vector, representing the position of the copy block in the search region) search process. During the search process, only 32 positions in the horizontal direction need to be searched, and a 5-bit fixed length code can be used to encode the horizontal BV without encoding the vertical BV.

For example, the size of the first prediction block can be 2*1, or the size of the first prediction block can be 4*1, or the size of the first prediction block can be 8*1. The above are just examples and are not limiting. For example, for intra block copy prediction mode 0, the first sub block of 8*2 can be split into two 8*1 prediction blocks, and the prediction values of each 8*1 prediction block can be determined based on the reference pixels in the first search region. For intra block copy prediction mode 1, the first sub block of 8*2 can be split into four 4*1 prediction blocks, and the prediction values of each 4*1 prediction block can be determined based on the reference pixels in the first search region. For intra block copy prediction mode 2, the first sub block of 8*2 can be split into eight 2*1 prediction blocks, and the prediction values of each 2*1 prediction block can be determined based on the reference pixels in the first search region.

For the second sub block, when the reference pixel at the left boundary of the current block is not available and the reference pixel outside the upper boundary of the current block is available (e.g., when the upper boundary of the current block does not belong to the picture boundary or slice boundary), after the reconstructed pixels of the first sub block are obtained, the second search region corresponding to the second sub block of the current block can be filled based on the reconstructed pixels (e.g., the reconstructed pixels on the first row of the upper boundary) at the upper boundary of the current block and the reconstructed pixels of the first sub block of the current block.

For example, based on the reconstructed pixels of the first row of the upper boundary and the reconstructed pixels of the first sub block of the current block, the complete region of the second designated region on the left side of the second sub block can be filled, and the complete region of the second designated region can be determined as the second search region corresponding to the second sub block. Assuming the size of the current block is 16*2, that is, the first row at the upper boundary of the current block includes 16*1 reconstructed pixels, and the second designated region is the 32*2 region on the left side of the second sub block, e.g., the second designated region is the 8*2 region of the first sub block and the 24*2 region on the left side of the current block. Since the 8*2 region of the first sub block has already been filled with the reconstructed pixels of the first sub block, the complete region (hereinafter referred to as region A) of the 24*2 region on the left side of the current block can be filled based on the 16*1 reconstructed pixels of the first row at the upper boundary and the 8*2 reconstructed pixels of the first sub block. For example, in the first row of region A, the 16*1 reconstructed pixels of the first row of the upper boundary are copied first, and then the 8*1 reconstructed pixels of the first row of the first sub block are copied. In the second row of region A, the 16*1 reconstructed pixels of the first row of the upper boundary are copied, and then the 8*1 reconstructed pixels of the second row of the first sub block are copied. Alternatively, in the first row of region A, the 8*1 reconstructed pixels in the first row of the first sub block are copied first, and then the 16*1 reconstructed pixels in the first row of the upper boundary are copied. In the second row of region A, the 8*1 reconstructed pixels in the second row of the first sub block are copied, and then the 16*1 reconstructed pixels in the first row of the upper boundary are copied. Alternatively, in the first row of region A, the 16*1 reconstructed pixels in the first row of the upper boundary are copied and 8 default values are embedded. In the second row of region A, the 16*1 reconstructed pixels in the first row of the upper boundary are copied and 8 default values are embedded. Alternatively, the first row of region A is first filled with 8 default values, and then the 16*1 reconstructed pixels in the first row of the upper boundary are copied. The second row of region A are first filled with 8 default values, and then the 16*1 reconstructed pixels in the first row of the upper boundary are copied. The above are just a few examples and are not limiting. After obtaining region A, region A and the 8*2 region of the first sub block form the complete region of the second designated region, to obtain the second search region corresponding to the second sub block.

For example, based on the reconstructed pixels of the first row of the upper boundary and the reconstructed pixels of the first sub block of the current block, the partial region of the second designated region on the left side of the second sub block can be filled, and the partial region of the second designated region can be determined as the second search region corresponding to the second sub block. Assuming the size of the current block is 16*2, that is, the first row at the upper boundary of the current block includes 16*1 reconstructed pixels, and the second designated region is the 8*2 region of the first sub block and the 24*2 region (referred to as region A) on the left side of the current block, based on the 16*1 reconstructed pixels on the first row of the upper boundary and the 8*2 reconstructed pixels of the first sub block, the partial region of region A can be filled, that is, when the search region cannot meet the specified search range, the search region can be directly reduced.

For example, a partial region of region A can be a 16*2 region on the left side of the current block. The 16*1 reconstructed pixels in the first row of the upper boundary are copied in the first row of this region, and the 16*1 reconstructed pixels in the first row of the upper boundary are copied in the second row of this region. Alternatively, in the first row of the region, the 8*1 reconstructed pixels in the first row of the first sub block are copied first, and then the first 8 reconstructed pixels in the first row of the upper boundary are copied. In the second row of the region, the 8*1 reconstructed pixels in the second row of the first sub block are copied, and then the last 8 reconstructed pixels in the first row of the upper boundary are copied. Alternatively, in the first row of the region, the first 8 reconstructed pixels in the first row of the upper boundary are copied, and then 8 default values are embedded. In the second row of the region, the last 8 reconstructed pixels in the first row of the upper boundary are copied, and then 8 default values are embedded. Alternatively, the first row of the region are filled with 8 default values, and then the first 8 reconstructed pixels in the first row of the upper boundary are copied. The second row of the region are filled with 8 default values, and then the last 8 reconstructed pixels in the first row of the upper boundary are copied. The above are just a few examples and are not limiting.

For example, a partial region of region A can be an 8*2 region on the left side of the current block. The first 8 reconstructed pixels of the first row of the upper boundary are copied in the first row of this region, and the last 8 reconstructed pixels of the first row of the upper boundary are copied in the second row of this region.

In summary, after a partial region of region A is filled, the reconstructed pixels of the first sub block and a partial region of region A form a partial region of the second designated region, where the partial region of the second designated region is used as the second search region.

For example, after the second search region corresponding to the second sub block is filled based on the reconstructed pixels at the upper boundary and the reconstructed pixels of the first sub block, the reconstructed pixels of the second sub block can be determined based on the reference pixels of the second search region. For example, based on the reference pixels of the second search region (such as a 32*2 search region, a 24*2 search region, or a 16*2 search region, etc.), the reconstructed pixels of the second sub block are determined.

For example, the second sub block can be split into N second prediction blocks, where N can be a positive integer, and the reconstructed pixels for each second prediction block can be determined based on the reference pixels in the second search region. For example, for each second prediction block, a reference block that matches the second prediction block can be found from the second search region, and the size of the reference block is the same as the size of the second prediction block. Based on this reference block, the reconstructed pixels of the second prediction block can be determined.

For example, the size of the second prediction block may be the same as the size of the first prediction block; Alternatively, the size of the second prediction block may be different from the size of the first prediction block. For example, the size of the first prediction block is 2*1, and the size of the second prediction block is 2*1 or 2*2; or the size of the first prediction block is 4*1, and the size of the second prediction block is 4*1 or 4*2; or the size of the first prediction block is 8*1, and the size of the second prediction block is 8*1 or 8*2. The above are just examples and are not limiting.

For example, for intra block copy prediction mode 0, the 8*2 second sub block can be split into two 8*1 prediction blocks, and the prediction values of each 8*1 prediction block can be determined based on the reference pixels in the second search region; or the second sub block of 8*2 can be split into one 8*2 prediction block, and the prediction values of each 8*2 prediction block can be determined based on the reference pixels in the second search region. For intra block copy prediction mode 1, the second sub block of 8*2 can be split into four 4*1 prediction blocks, and the prediction values of each 4*1 prediction block can be determined based on the reference pixels in the second search region; or the second sub block of 8*2 can be split into two 4*2 prediction blocks, and the prediction values for each 4*2 prediction block can be determined based on the reference pixels in the second search region. For intra block copy prediction mode 2, the second sub block of 8*2 can be split into eight 2*1 prediction blocks, and the prediction values of each 2*1 prediction block can be determined based on the reference pixels in the second search region. Alternatively, the second sub block of 8*2 can be split into four 2*4 prediction blocks, and the prediction values for each 2*2 prediction block can be determined based on the reference pixels in the second search region.

In an embodiment, the size of the first prediction block can be derived from the position or from the number of reconstructed pixels (instead of filled pixels) in the search region; the size of the second prediction block can be derived from the position or from the number of reconstructed pixels in the search region. For example, for intra block copy prediction mode 2, when the left boundary is not available, the size of the prediction block within the first sub block can be 2*1, and the size of the prediction block within the second sub block can be 2*1. Alternatively, the size of the prediction block within the first sub block can be 2*1, and the size of the prediction block within the second sub block can be 2*2.

When the left boundary of the current block is not available, or when the current block is close to the left boundary and the search region cannot meet the specified search range, the search region can be directly reduced without using the default value to fill or without expanding the fill range (for example, when using reconstruct pixels of the first row of the upper boundary to fill, the fill length is the width of the current block, and the rest of the positions are not filled, resulting in a smaller search range).

Embodiment 8: For a current block of 16*2 (similar to current blocks of other sizes), the current block can be split into a first sub block and a second sub block. The size of the first sub block is 8*2, and the size of the second sub block is 8*2. For the first sub block, when the reference pixel at the left boundary of the current block is not available and the reference pixel outside the upper boundary of the current block is available (such as when the upper boundary of the current block does not belong to the picture boundary or slice boundary), the first search region corresponding to the first sub block of the current block can be determined based on the reconstructed pixels at the upper boundary. For example, the reconstructed pixels of the upper boundary are directly determined as the first search region corresponding to the first sub block. After the first search region corresponding to the first sub block is determined based on the reconstructed pixels of the upper boundary, the reconstructed pixels of the first sub block can be determined based on the reference pixels of the first search region. For example, the first sub block can be split into M first prediction blocks, where M can be a positive integer, and the reconstructed pixels for each first prediction block can be determined based on the reference pixels in the first search region. For example, the size of the first prediction block can be 2*1, or the size of the first prediction block can be 4*1, or the size of the first prediction block can be 8*1. The above are just examples and are not limiting.

For the second sub block, when the reference pixel at the left boundary of the current block is not available and the reference pixel outside the upper boundary of the current block is available (e.g., when the upper boundary of the current block does not belong to the picture boundary or slice boundary), after the reconstructed pixels of the first sub block are obtained, the second search region corresponding to the second sub block of the current block can be determined based on the reconstructed pixels at the upper boundary of the current block and/or the reconstructed pixels of the first sub block of the current block. For example, the reconstructed pixels of the upper boundary can be directly determined as the second search region corresponding to the second sub block. Alternatively, the reconstructed pixels of the first sub block can be directly determined as the second search region corresponding to the second sub block. After the second search region corresponding to the second sub block is filled based on reconstructed pixels of the upper boundary and/or reconstructed pixels of the first sub block, the reconstructed pixels of the second sub block can be determined based on the reference pixels of the second search region. For example, the second sub block can be split into N second prediction blocks, where N can be a positive integer, and the reconstructed pixels for each second prediction block can be determined based on the reference pixels in the second search region. The size of the second prediction block can be the same or different from the size of the first prediction block. For example, the size of the first prediction block is 2*1, and the size of the second prediction block is 2*1 or 2*2; or the size of the first prediction block is 4*1, and the size of the second prediction block is 4*1 or 4*2; or the size of the first prediction block is 8*1, and the size of the second prediction block is 8*1 or 8*2. The above are just examples and are not limiting.

In an embodiment, the reconstructed pixels of the upper boundary may include, but are not limited to, the reconstructed pixels of the first row of the upper boundary, that is, the reconstructed pixels of the first row of the upper boundary are used as the first search region corresponding to the first sub block, and the reconstructed pixels of the first row of the upper boundary are used as the second search region corresponding to the second sub block. Alternatively, the reconstructed pixels of the upper boundary may include, but are not limited to the reconstructed pixels in the first row of the upper boundary and the reconstructed pixels in the second row of the upper boundary. That is, the reconstructed pixels in the first row of the upper boundary and the reconstructed pixels in the second row of the upper boundary can be used as the first search region corresponding to the first sub block, and the reconstructed pixels in the first row of the upper boundary and the reconstructed pixels in the second row of the upper boundary can be used as the second search region corresponding to the second sub block. The above is just examples and not limitations. For example, the reconstructed pixels in the first P rows at the upper boundary can also be used, where P can be 1, 2, 3, 4, and so on.

The length of the reconstructed pixels at the upper boundary can be equal to the width of the current block. Alternatively, the length of the reconstructed pixels at the upper boundary can be greater than the width of the current block. Alternatively, the length of the reconstructed pixels at the upper boundary can be smaller than the width of the current block.

In an embodiment, for the current block whose left boundary is not available and whose upper boundary is available, the search region can be a 16*1 reconstructed pixel region at the upper boundary of the current block (such as a 16*2 current block), and the size of the prediction block can be 4*1. As shown in FIG. 8B, the search region is a 16*1 reconstructed pixel region at the upper boundary. For the current block where the left boundary is not available and the upper boundary is not available. IBC mode cannot be enabled. For IBC modes in other locations, the implementation will not be elaborated further.

In an embodiment, for the current block whose left boundary is not available and whose upper boundary is available, the search region can be a 32*1 reconstructed pixel region at the upper boundary of the current block (such as a 16*2 current block), and the size of the prediction block can be 4*1. As shown in FIG. 8C, the search region is a 32*1 reconstructed pixel region at the upper boundary.

In an embodiment, lossless compression refers to the technique of compressing redundant information of an original picture and reconstructing for the original picture without causing any distortion. When there are some errors between the reconstructed picture and the original picture, and the errors are limited within a certain range, it can be called Near-Lossless Compression. In the compression encoding process, it is necessary to predict residual values between pixels in the original picture, where the residual values are used to indicate the differences between pixels. Using Semi Fixed-Length Code to encode residual values further reduces the code length. However, Semi Fixed-Length Code technology still has problems such as longer code lengths and lower encoding efficiency.

For example, for signed fixed length encoding, when the fixed length code is N, the range of values to be encoded can be $[-(1<<(N-1)), (1<<(N-1))-1]$. Alternatively, the range of values to be encoded is $[1-(1<<(N-1)), (1<<(N-1))]$. Alternatively, the range of the values to be encoded is $[1-(1<<(N-1)), (1<<(N-1))]$ or $[-(1<<(N-1)), (1<<(N-1))-1]$. When the value to be encoded is not equal to the boundary value, for example, $+(1<<(N-1))$ or $-(1<<(N-1))$, the encoding and decoding scheme remains unchanged. When the value to be encoded is equal to the boundary value, one bit is used to encode or decode the sign of this value. This scheme is suitable for encoding and decoding schemes where multiple values are grouped together, such as 4 residuals as a group, and the fixed length codes of the 4 residuals are the same. When there are boundary values in the group, a sign bit needs to be encoded or decoded, otherwise there is no need to encode or decode the sign bit.

However, for signed fixed length encoding schemes, the range of coefficient values that can be expressed during encoding is 2 to the power of n. Since there is the coefficient value equal to 0, the positive and negative fields cannot be symmetrical. However, in general, the distribution of residuals follows the characteristic of zero mean. Therefore, when using signed fixed length codes to encode residuals, it is inevitable to lean towards positive values or negative values.

For multiple groups, a sign bit can be encoded to determine the sign of the current group, which can solve the problem of biased value range when encoding residuals with signed fixed length codes. However, the parsing of the sign bit depends on the parsing of the residual, which in turn depends on the parsing of the fixed length code. This dependence can lead to high hardware implementation costs, resulting in poor encoding and decoding performance.

For the above findings, in the embodiments of the present disclosure, for a signed fixed length encoding scheme, it is possible to design a way to know whether the current group needs to parse the sign bit before parsing the residual, without relying on parsing the residuals. For example, design a sign bit parsing scheme that relies on a fixed length code value. When using a signed fixed length code to encode residuals, when the fixed length code length is less than or equal to the target value K, the current encoding group needs to parse the sign bit; otherwise, there is no need to parse the sign bit.

The following provides a detailed explanation of the encoding and decoding method in the embodiments of the present disclosure, based on several embodiments.

Embodiment 9: a decoding method is proposed in the embodiments of the present disclosure, which can be applied to the decoding device (also known as a video decoder), as shown in FIG. 9A, which is a flowchart of the decoding method. The method may include steps 911 to 914.

In step 911, a fixed length code corresponding to each sub block within the current block is decoded from the corresponding bitstream.

In step 912, for each sub block within the current block, based on the fixed length code corresponding to the sub block, the residual value corresponding to each position (such as pixel position) within the sub block is decoded from the bitstream corresponding to the current block.

In step 913, for each sub block within the current block, it is determined whether to decode the sign bit for the sub block based on the value of the fixed length code; if so, the sign bit corresponding to the sub block is decoded from the bitstream corresponding to the current block.

In step 914, for each sub block within the current block, if the residual value corresponding to a target position within the sub block is a residual boundary value, the sign of the residual boundary value is determined based on the sign bit. The target position can be any one position within the sub block.

In an embodiment, determining whether to decode the sign bit corresponding to the sub block based on the value of the fixed length code corresponding to the sub block may include, but is not limited to: if the value of the fixed length code corresponding to the sub block is less than or equal to the target value K, determining to decode the sign bit corresponding to the sub block; otherwise, determining not to decode the sign bit corresponding to the sub block.

For example, the target value K can be a fixed value agreed upon by the decoding and encoding devices; or the target value K can be the value parsed by the decoding device from the picture header; or the target value K can be a value derived based on the picture bit width; or the target value K can be a value derived based on the QP parameter. The above are just a few examples and are not limiting.

In an embodiment, decoding the fixed length code corresponding to each sub block within the current block from the bitstream corresponding to the current block may include, but is not limited to, for the first sub block, decoding the fixed length code corresponding to the sub block from the bitstream. For a sub block that is not the first sub block, the first indication information corresponding to the sub block can be decoded from the bitstream, where the first indication information can be used to indicate whether the fixed length code corresponding to this sub block is the same as the fixed length code corresponding to a previous sub block of this sub block. On this basis, if the first indication information indicates that the fixed length code corresponding to this sub block is the same as the fixed length code corresponding to a previous sub block of this sub block, the fixed length code corresponding to the sub block can be determined based on the fixed length code corresponding to the previous sub block of the sub block; if the first indication information indicates that the fixed length code corresponding to this sub block is different from the fixed length code corresponding to a previous sub block of this sub block, the fixed length code corresponding to the sub block can be decoded from the bitstream.

In an embodiment, decoding the fixed length code corresponding to each sub block within the current block from the bitstream corresponding to the current block may include, but is not limited to: decoding the second indication information corresponding to the current block from the bitstream, where the second indication information is configured to indicate whether the sub block belongs to the same merge group as a previous sub block of the sub block. The fixed length code corresponding to each sub block within the same merge group is the same, and the fixed length codes corresponding to sub blocks in different merge groups are different. For the first sub block, the fixed length code corresponding to the first sub block is decoded from the bitstream. For a sub block that is not the first sub block, if the second indication information indicates that the sub block belongs to the same merge group as the previous sub block of the sub block, the fixed length code corresponding to the sub block is determined based on the fixed length code of the previous sub block; if the second indication information indicates that the sub block and the previous sub block belong to different merging groups, the to-be-adjusted fixed length code corresponding to the sub block is decoded from the bitstream, and the to-be-adjusted fixed length code is adjusted based on the fixed length code corresponding to the previous sub block, to obtain the final fixed length code corresponding to the sub block.

Similarly, the embodiments of the present disclosure propose an encoding method that can be applied to the encoding device (also known as a video encoder), as shown in FIG. 9B, which is a flowchart of the encoding method. The method may include steps 921 to 923.

In step 921, the fixed length code corresponding to each sub block within the current block is encoded in the corresponding stream of the current block.

In step 922, for each sub block in the current block, based on the fixed length code corresponding to that sub block, encode the residual value corresponding to each position (such as pixel position) in the bitstream corresponding to the current block.

In step 923, for each sub block within the current block, it is determined whether to encode the sign bit for the sub block based on the value of the fixed length code; if so, the sign bit corresponding to the sub block is encoded in the bitstream corresponding to the current block.

For example, for each sub block within the current block, when the residual value corresponding to a target position within the sub block is a residual boundary value, the sign bit corresponding to the sub block is determined based on the sign of the residual boundary value. That is, the sign bit corresponding to the sub block is configured to indicate the sign of the residual boundary value, and the target position can be any one position within the sub block.

In an embodiment, determining whether to encode the sign bit corresponding to the sub block based on the value of the fixed length code corresponding to the sub block may include, but is not limited to: if the value of the fixed length code corresponding to the sub block is less than or equal to the target value K, determining to encode the sign bit corresponding to the sub block; otherwise, determining not to encode the sign bit corresponding to the sub block.

For example, the target value K can be a fixed value agreed upon by the decoding and encoding devices; or the target value K can be the value encoded by the encoding device in the picture header; or the target value K can be a value derived based on the picture bit width; or the target value K can be a value derived based on a QP parameter. The above are just examples and are not limiting.

In an embodiment, encoding the fixed length code corresponding to each sub block within the current block in the corresponding bitstream may include, but is not limited to, for the first sub block, encoding the fixed length code corresponding to the sub block in the bitstream. For the sub block that is not the first sub block, if the fixed length code corresponding to the sub block is the same as the fixed length code corresponding to the previous sub block of the sub block, the first indication information corresponding to the sub block is encoded in the bitstream, and the first indication information can be used to indicate that the fixed length code corresponding to the sub block is the same as the fixed length code corresponding to the previous sub block. If the fixed length code corresponding to the sub block is different from the fixed length code corresponding to the previous sub block, the first indication information corresponding to the sub block is encoded in the bitstream, and the first indication information can be used to indicate that the fixed length code corresponding to the sub block is different from the fixed length code corresponding to the previous sub block, and the fixed length code corresponding to the sub block is encoded in the bitstream.

In an embodiment, encoding the fixed length code corresponding to each sub block within the current block in the bitstream corresponding to the current block may include, but is not limited to: encoding the second indication information corresponding to the current block in the bitstream, where the second indication information is configured to indicate whether the sub block belongs to the same merge group as a previous sub block of the sub block. The fixed length code corresponding to each sub block within the same merge group is the same, and the fixed length codes corresponding to sub blocks in different merge groups are different. For the first sub block, the fixed length code corresponding to the sub block is encoded in the bitstream. For the sub block that is not the first sub block, if the second indication information indicates that the sub block belongs to the same merge group as the previous sub block of the sub block, encoding the fixed length code corresponding to the sub block in the bitstream is prohibited; if the second indication information indicates that the sub block belongs to a different merge group from the previous sub block of the sub block, the corresponding to-be-adjusted fixed length code for the sub block is encoded in the bitstream. For example, when encoding the to-be-adjusted fixed length code corresponding to the sub block in the bitstream, the to-be-adjusted fixed length code corresponding to the sub block can be determined based on the fixed length codes corresponding to the previous sub block of the sub block, and then the to-be-adjusted fixed length code corresponding to the sub block can be encoded in the bitstream.

From the above technical solutions, it can be seen that in the embodiments of the present disclosure, optimizing the boundary sign bits of signed fixed length codes is beneficial for improving compression efficiency and reducing hardware costs, such that the parsing of sign bits does not depend on the residual values themselves.

Embodiment 10: for the scheme of signed fixed length encoding boundary values, the embodiments of the present disclosure propose a decoding method and an encoding method, which can be applied to the decoding or encoding device. The method may include the following steps S11 to S15.

In step S11, for the current block, the decoding device parses the sub block grouping information of the current block.

Corresponding to the processing flow of the decoding device, the encoding device encodes the sub block grouping information of the current block.

For example, the encoding device encodes the sub block grouping information of the current block in the bitstream of the current block, and the decoding device decodes the sub block grouping information of the current block from the bitstream of the current block. There are no restrictions on this encoding and decoding process.

For example, the sub block grouping information is configured to indicate how to split the current block into sub blocks. For example, if the current block is a 16*2 block, the sub block grouping information is configured to indicate to split the current block into two 8*2 sub blocks, or the sub block grouping information is configured to indicate to split the current block into four 4*2 sub blocks, or the sub block grouping information is configured to indicate to split the current block into eight 2*2 sub blocks, or the sub block grouping information is configured to indicate to split the current block into four 8*1 sub blocks, or the sub block grouping information is configured to indicate to split the current block into eight 4*1 sub blocks, or the sub block grouping information is configured to indicate to split the current block into sixteen 2*1 sub blocks. Regarding other sizes of the current block, the embodiments are similar and will not be repeated here.

As an example, the sub block splitting manner of the current block can also be fixed, that is, the encoding device and decoding device agree on the sub block splitting manner of the current block. In this way, the encoding device does not need to encode the sub block grouping information of the current block, and the decoding device does not need to parse the sub block grouping information of the current block. For example, assuming the current block is a 16*2 block, both the encoding and decoding devices directly and fixedly split the current block into two 8*2 sub blocks, or split the current block into four 4*2 sub blocks, or split the current block into eight 2*2 sub blocks, or split the current block into four 8*1 sub blocks, or split the current block into eight 4*1 sub blocks, or split the current block into sixteen 2*1 sub blocks. The above are just a few examples and are not limiting.

In step S12, for each sub block within the current block, the decoding device parses the fixed length code corresponding to the sub block.

Corresponding to the processing flow of the decoding device, the encoding device encodes the fixed length code corresponding to the sub block.

For example, for each sub block within the current block, the encoding device encodes the fixed length code corresponding to the sub block in the bitstream corresponding to the current block, and the decoding device decodes the fixed length code corresponding to the sub block from the bitstream corresponding to the current block.

For example, the fixed length code corresponding to the sub block is configured to indicate the length of the residual value corresponding to each position (such as pixel position) within the sub block. For example, the fixed length code corresponding to sub block A is configured to indicate the length of the residual value corresponding to each position within sub block A, the fixed length code corresponding to sub block B is configured to indicate the length of the residual value corresponding to each position within sub block B, and so on. Assuming that the fixed length code corresponding to sub block A is 4, based on this fixed length code, bits 1-4 can be used as the residual value corresponding to the first position of sub block A, bits 5-8 can be used as the residual value corresponding to the second position of sub block A, and so on.

For example, for the parsing of the fixed length code corresponding to each sub block, variable length codes can be used for parsing.

In an embodiment, the encoding device encodes the fixed length code corresponding to each sub block in the bitstream corresponding to the current block, and the decoding device decodes the fixed length code corresponding to each sub block from the bitstream corresponding to the current block. For example, the encoding device sequentially encodes the fixed length codes corresponding to sub block A, sub block B, and so on in the bitstream corresponding to the current block. The decoding device sequentially decodes the fixed length codes corresponding to sub block A, sub block B, and so on in the bitstream corresponding to the current block.

In an embodiment, for the first sub block, the encoding device encodes the fixed length code corresponding to the sub block in the bitstream, and the decoding device decodes the fixed length code corresponding to the sub block from the bitstream. For the sub block that is not the first sub block, if the fixed length code corresponding to the sub block is the same as the fixed length code corresponding to the previous sub block of the sub block, the encoding device encodes the first indication information corresponding to the sub block in the bitstream, and the first indication information is configured to indicate that the fixed length code corresponding to the sub block is the same as the fixed length code corresponding to the previous sub block of the sub block; and the decoding device decodes the first indication information corresponding to the sub block from the bitstream, and if the first indication information is configured to indicate that the fixed length code corresponding to the sub block is the same as the fixed length code corresponding to the previous sub block of the sub block, the fixed length code corresponding to the sub block is determined based on the fixed length code corresponding to the previous sub block. For the sub block that is not the first sub block, if the fixed length code corresponding to the sub block is different from the fixed length code corresponding to the previous sub block of the sub block, the encoding device encodes the first indication information corresponding to the sub block in the bitstream, and the first indication information is configured to indicate that the fixed length code corresponding to the sub block is different from the fixed length code corresponding to the previous sub block of the sub block, and encodes the fixed length code corresponding to the sub block in the bitstream; and the decoding device decodes the first indication information corresponding to the sub block from the bitstream, and if the first indication information is configured to indicate that the fixed length code corresponding to the sub block is different from the fixed length code corresponding to the previous sub block of the sub block, the fixed length code corresponding to the sub block is decoded from the bitstream.

Where the first indication information is configured to indicate whether the fixed length code of the current sub block is the same as the fixed length code of the previous sub block, which can be represented by 1 bit. That is, for the second or subsequent sub block, 1 bit is used to parse whether the fixed length code of the sub block is the same as the fixed length code of the previous sub block. For example, the first indication information is the first value, indicating that the fixed length code of the current sub block is the same as the fixed length code of the previous sub block, and the first indication information is the second value, indicating that the fixed length code of the current sub block is different from the fixed length code of the previous sub block.

For example, the encoding device encodes, in the bitstream corresponding to the current block, the fixed length code corresponding to sub block A, the first indication information corresponding to sub block B, the fixed length code corresponding to sub block B (if the first indication information corresponding to sub block B is configured to indicate that the fixed length code is the same, the bitstream does not carry the fixed length code corresponding to sub block B; if the first indication information corresponding to sub block B is configured to indicate that the fixed length code is different, the bitstream carries the fixed length code corresponding to sub block B), the first indication information corresponding to sub block C, and the fixed length code corresponding to sub block C (if the first indication information corresponding to sub block C is configured to indicate that the fixed length code is the same, the bitstream does not carry the fixed length code corresponding to sub block C, and if the corresponding first indication information is configured to indicate that the fixed length code is different, the bitstream carries the fixed length code corresponding to sub block C), and so on.

The decoding device decodes the fixed length code corresponding to sub block A and the first indication information corresponding to sub block B from the bitstream corresponding to the current block. If the first indication information corresponding to sub block B is configured to indicate that the fixed length code is the same, the fixed length code corresponding to sub block A is used as the fixed length code corresponding to sub block B, and the fixed length code corresponding to sub block B is no longer decoded from the bitstream. If the first indication information corresponding to sub block B is configured to indicate that the fixed length code is different, the fixed length code corresponding to sub block B is decoded from the bitstream. Then, the first indication information corresponding to sub block C is decoded from the bitstream corresponding to the current block. If the first indication information corresponding to sub block C is configured to indicate that the fixed length code is the same, the fixed length code corresponding to sub block B is used as the fixed length code corresponding to sub block C, and the fixed length code corresponding to sub block C is no longer decoded from the bitstream. If the first indication information corresponding to sub block C is configured to indicate that the fixed length code is different, the fixed length code corresponding to sub block C is decoded from the bitstream, and so on.

In an embodiment, the encoding device can encode the second indication information corresponding to the current block in the bitstream, and the decoding device can decode the second indication information corresponding to the current block from the bitstream. The second indication information is configured to indicate whether the sub block and the previous sub block of the sub block belong to the same merging group. The fixed length codes corresponding to each sub block in the same merging group can be the same, and the fixed length codes corresponding to each sub block in different merging groups can be different. For example, the first bit of the second indication information is configured to indicate whether the second sub block and the first sub block belong to the same merge group. For example, when the first bit takes the first value, it indicates that they belong to the same merge group, and when the first bit takes the second value, it indicates that they do not belong to the same merge group. The second bit of the second indication information is configured to indicate whether the third sub block and the second sub block belong to the same merge group, and so on.

For the first sub block, the encoding device encodes the fixed length code corresponding to the sub block in the bitstream, and the decoding device decodes the fixed length code corresponding to the sub block from the bitstream. For the sub block that is not the first sub block, if the second indication information indicates that the sub block belongs to the same merge group as the previous sub block of the sub block, the encoding device does not encode the fixed length code corresponding to the sub block in the bitstream; and the decoding device determines the fixed length code corresponding to the sub block based on the fixed length code corresponding to the previous sub block of the sub block, without decoding the fixed length code corresponding to the sub block from the bitstream. If the second indication information indicates that the sub block and the previous sub block of the sub block belong to different merging groups, the encoding device encodes the to-be-adjusted fixed length code corresponding to the sub block in the bitstream, for example, determines the to-be-adjusted fixed length code corresponding to the sub block based on the fixed length code corresponding to the previous sub block of the sub block, and encodes the to-be-adjusted fixed length code corresponding to the sub block in the bitstream; and the decoding device decodes the to-be-adjusted fixed length code corresponding to the sub block from the bitstream, adjusts the to-be-adjusted fixed length code based on the fixed length codes corresponding to the previous sub block of the sub block, to obtain the final fixed length code corresponding to the sub block.

From the above, it can be seen that the decoding device can parse the merging situation of each sub block (such as 4*1 sub block) in the entire current block. If the second group (i.e., the second sub block) is not merged with the first group (such as the first sub block), the fixed length code of the second group is not equal to the fixed length code of the first group. When parsing the fixed length code of the second group, if the codeword of the first group is shorter, the fixed length code of the second group can also be adjusted based on the fixed length code of the first group, that is, the fixed length code of the second group is assigned another value.

For example, the encoding device encodes the second indication information, the fixed length code corresponding to sub block A, the to-be-adjusted fixed length code corresponding to sub block B (if the second indication information indicates that sub block B and sub block A belong to the same merging group, the code stream does not carry the to-be-adjusted fixed length code corresponding to sub block B; if the second indication information indicates that sub block B and sub block A belong to different merging groups, the code stream carries the to-be-adjusted fixed length code corresponding to sub block B), the to-be-adjusted fixed length code corresponding to sub block C (if the second indication information indicates that sub block C and sub block B belong to the same merging group, the code stream does not carry the to-be-adjusted fixed length code corresponding to sub block C; if the second indication information indicates that sub block C and sub block B belong to different merging groups, the code stream carries the to-be-adjusted fixed length code corresponding to sub block C), and so on.

The decoding device decodes the second indication information from the bitstream corresponding to the current block, and decodes the fixed length code corresponding to sub block A from the bitstream corresponding to the current block. If the second indication information indicates that sub block B and sub block A belong to the same merge group, the fixed length code corresponding to sub block A will be used as the fixed length code corresponding to sub block B, and the decoding device will no longer decode the fixed length code corresponding to sub block B from the bitstream. If the second indication information indicates that sub block B and sub block A belong to different merge groups, the decoding device will decode the to-be adjusted fixed length code corresponding to sub block B from the bitstream, adjust the to-be adjusted fixed length code based on the fixed length code corresponding to sub block A, to obtain the final fixed length code corresponding to sub block B. If the second indication information indicates that sub block C and sub block B belong to the same merge group, the fixed length code corresponding to sub block B will be used as the fixed length code corresponding to sub block C, and the decoding device will no longer decode the fixed length code corresponding to sub block C from the bitstream. If the second indication information indicates that sub block C and sub block B belong to different merge groups, the decoding device will decode the to-be adjusted fixed length code corresponding to sub block C from the bitstream, adjust the to-be adjusted fixed length code based on the fixed length code corresponding to sub block B, to obtain the final fixed length code corresponding to sub block C, and so on.

For example, assuming that the fixed length codes are m1, m2, m3, and m4 in sequence, where the codeword of m1 is less than the codeword of m2, the codeword of m2 is less than the codeword of m3, and the codeword of m3 is less than the codeword of m4. Based on this, assuming that the fixed length code corresponding to sub block A is m1, and the second indication information indicates that sub block B and sub block A belong to different merging groups, if the final fixed length code corresponding to sub block B is m3, the to-be-adjusted fixed length code corresponding to sub block B encoded in the bitstream can be m2 (i.e., the codeword is less). After decoding the to-be-adjusted fixed length code m2 from the bitstream, because the fixed length code corresponding to sub block A is m1, is located before m2, the decoding device can adjust the to-be-adjusted fixed length code m2 to obtain the final fixed length code m3 corresponding to sub block B. Alternatively, assuming that the fixed length code corresponding to sub block A is m4 and the second indication information indicates that sub block B and sub block A belong to different merging groups, if the final fixed length code corresponding to sub block B is m3, then the to-be-adjusted fixed length code corresponding to sub block B encoded in the bitstream can be m3. After decoding the to-be-adjusted fixed length code m3 from the bitstream, because the fixed length code corresponding to sub block A is m4, is located after m3, the decoding device can keep the to-be-adjusted fixed length code m3 unchanged, to obtain the final to-be-adjusted fixed length code corresponding to sub block B as m3.

In step S13, for each sub block in the current block, the decoding device uses the fixed length code corresponding to the sub block to parse the residual value at each position in the sub block, for example, decodes the residual value at each position in the sub block from the bitstream corresponding to the current block.

Corresponding to the processing flow of the decoding device, the encoding device uses the fixed length code corresponding to the sub block to encode the residual value at each position within the sub block, i.e., encodes the residual value at each position within the sub block in the bitstream corresponding to the current block.

In step S14, for each sub block within the current block, the decoding device determines whether to decode the sign bit corresponding to the sub block based on the value of the fixed length code corresponding to the sub block; if so, the decoding device decodes the sign bit corresponding to the sub block from the bitstream corresponding to the current block; if not, the decoding device does not decode the sign bit corresponding to the sub block from the bitstream corresponding to the current block.

Corresponding to the processing flow of the decoding device, the encoding device determines whether to encode the sign bit corresponding to the sub block based on the value of the fixed length code corresponding to the sub block; if so, the encoding device can encode the sign bit corresponding to the sub block in the bitstream corresponding to the current block; if not, the encoding device cannot encode the sign bit corresponding to the sub block in the bitstream corresponding to the current block.

In an embodiment, the parsing of the sign bit can depend on the value of the fixed length code. For example, when the value of the fixed length code is less than or equal to the target value K, the encoding device needs to encode the sign bit in the bitstream corresponding to the current block, and the decoding device ca decode the sign bit from the bitstream corresponding to the current block. When the value of the fixed length code is greater than the target value K, the encoding device does not encode the sign bit in the bitstream corresponding to the current block, and the decoding device does not decode the sign bit from the bitstream corresponding to the current block.

For example, the target value K can be a fixed value agreed upon by the decoding and encoding devices, that is, the target value K is a fixed value agreed upon by the decoding and encoding devices. Alternatively, the target value K can be a value parsed from the picture header, for example, the target value K can be a value encoded by the encoding device in the picture header, and the target value K can be a value parsed from the picture header by the decoding device. Alternatively, the target value K can be a value derived from the picture bit width, for example, the target value K can be a value derived from the picture bit width by the encoding device, and the target value K can be a value derived from the picture bit width by the decoding device. Alternatively, the target value K can be a value derived from QP parameters, for example, the target value K can be a value derived from QP parameters by the encoding device, and the target value K can be a value derived from QP parameters by the decoding device. The above are just a few examples of the target value K, and there is no limitation on this target value K, as long as the encoding and decoding devices can obtain the target value K.

In step S15, for each sub block within the current block, if the residual value corresponding to the target position within the sub block is a residual boundary value, the decoding device determines the sign of the residual boundary value based on the sign bit. The target position can be any one position within the sub block.

Corresponding to the processing flow of the decoding device, if the residual value corresponding to the target position within a sub block is a residual boundary value, the encoding device determines the sign bit corresponding to the sub block based on the sign of the residual boundary value, where the sign bit is configured to indicate the sign of the residual boundary value.

For example, the sign bit corresponding to a sub block being the first value indicates that the sign of the residual boundary value is negative. In this case, all coefficient values (such as residual values) in the sub block equal to $2^{\wedge}(coding\ length-1)$ are equal to $-2^{\wedge}(coding\ length-1)$. Otherwise, the sign bit corresponding to the sub block being the second value indicates that the sign of the residual boundary value is positive, and all coefficient values (such as residual values) in the sub block equal to $2^{\wedge}(coding\ length-1)$ are equal to $2^{\wedge}(coding\ length-1)$.

From the above, it can be seen that the coding length can be parsed from the bitstream first. All coefficients (such as, residual values) in the sub block are parsed using the same fixed length code as the coding length. Therefore, the range of coefficient parsing can be $[-2^{\wedge}(coding\ length-1)-1, 2^{\wedge}(coding\ length-1)]$. For example, if there are one or more coefficient values of $2^{\wedge}(coding\ length-1)$ within a group, one sign bit is parsed, and all coefficient values equal to $2^{\wedge}(coding\ length-1)$ within the group share one sign bit. If the parsed sign is negative, coefficient values within the group equal to $2^{\wedge}(coding\ length-1)$ are equal to $-2^{\wedge}(coding\ length-1)$. Otherwise, the coefficient values within the group equal to $2^{\wedge}(coding\ length-1)$ are equal to $2^{\wedge}(coding\ length-1)$.

The above embodiments can be implemented separately or in combination. For example, each of embodiments 1-10 can be implemented separately, and at least two of embodiments 1-10 can be implemented in combination. For example, embodiments 1-3 can be implemented in any combination, embodiments 4-5 can be implemented in any combination, embodiments 6-8 can be implemented in any combination, and embodiments 9-10 can be implemented in any combination.

For example, in the above embodiments, the content of the encoding device can also be applied to the decoding device, that is, the decoding device can process in the same way, and the content of the decoding device can also be applied to the encoding device, that is, the encoding device can process in the same way.

Based on the same application concept as the above method, the embodiments of the present disclosure further propose an encoding and decoding device. The device is applied to the decoding device. The device includes: one or more memories configured to store video data; and a decoder configured to implement the encoding or decoding method in embodiments 1-10, namely the processing flow of the decoding device.

For example, in an embodiment, a decoder is configured to achieve:

when a reference pixel of a current block is not available, removing a target prediction mode from an initial prediction mode list corresponding to the current block to obtain a target prediction mode list; and encoding or decoding the current block based on the target prediction mode list; or when a reference pixel at a first boundary of a current block is not available and a reference pixel at a second boundary of the current block is available, filling the reference pixel at the first boundary based on the reference pixel at the second boundary; and encoding or decoding the current block based on the filled reference pixel at the first boundary and the filled reference pixel at the second boundary; or when an intra block copy prediction mode is enabled for a current block, a reference pixel at a left boundary of the current block is not available, and a reference pixel at an upper boundary of the current block is available, determining a first search region corresponding to a first sub block of the current block based on a reconstructed pixel outside the upper boundary, and determining a reconstructed pixel of the first sub block based on a reference pixel of the first search region; and after obtaining the reconstructed pixel of the first sub block, determining a second search region corresponding to a second sub block of the current block based on a reconstructed pixel outside the upper boundary, and determining a reconstructed pixel of the second sub block based on a reference pixel of the second search region; where the current block includes the first sub block and the second sub block; or decoding a fixed length code corresponding to each sub block within a current block from a bitstream corresponding to the current block; for each sub block within the current block, based on the fixed length code corresponding to the sub block, decoding a residual value corresponding to each position within the sub block from the bitstream corresponding to the current block; determining whether to decode a sign bit corresponding to the sub block based on a value of the fixed length code corresponding to the sub block; in response to determining to decode the sign bit corresponding to the sub block, decoding the sign bit corresponding to the sub block from the bitstream corresponding to the current block; and when a residual value corresponding to a target position within the sub block is a residual boundary value, determining a sign of the residual boundary value based on the sign bit, where the target position is any one position within the sub block.

Based on the same application concept as the above method, the embodiments of the present disclosure further propose an encoding and decoding device. The device is applied to the encoding device. The device includes: one or more memories configured to store video data; and an encoder configured to implement the encoding or decoding method in embodiments 1-10, namely the processing flow of the encoding device.

For example, in an embodiment, an encoder is configured to achieve:

when a reference pixel of a current block is not available, removing a target prediction mode from an initial prediction mode list corresponding to the current block to obtain a target prediction mode list; and encoding or decoding the current block based on the target prediction mode list; or when a reference pixel at a first boundary of a current block is not available and a reference pixel at a second boundary of the current block is available, filling the reference pixel at the first boundary based on the reference pixel at the second boundary; and encoding or decoding the current block based on the filled reference pixel at the first boundary and the filled reference pixel at the second boundary; or when an intra block copy prediction mode is enabled for a current block, a reference pixel at a left boundary of the current block is not available, and a reference pixel at an upper boundary of the current block is available, determining a first search region corresponding to a first sub block of the current block based on a reconstructed pixel outside the upper boundary, and determining a reconstructed pixel of the first sub block based on a reference pixel of the first search region; and after obtaining the reconstructed pixel of the first sub block, determining a second search region corresponding to a second sub block of the current block based on a reconstructed pixel outside the upper boundary, and determining a reconstructed pixel of the second sub block based on a reference pixel of the second search region; where the current block includes the first sub block and the second sub block.

Figure 9C:
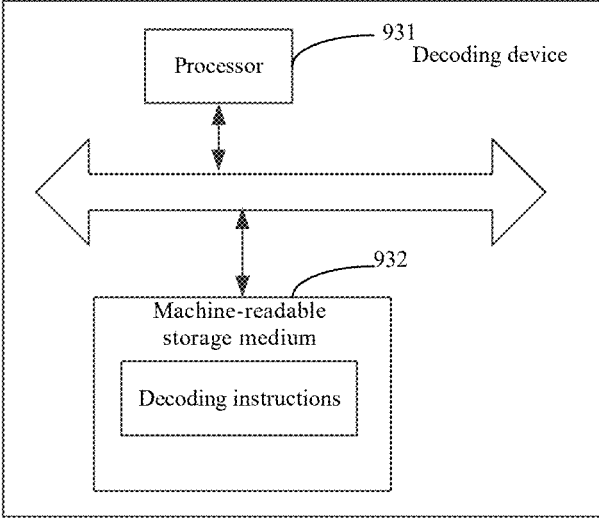
FIG. 9C is a hardware structure diagram of a decoding device according to an embodiment of the present disclosure.

Based on the same application concept as the above methods, a decoding device (also referred to as a video decoder) provided in the embodiments of the present disclosure has, from a hardware perspective, a hardware architecture, as shown in FIG. 9C. The hardware architecture schematic includes processor 931 and machine-readable storage medium 932, where machine-readable storage medium 932 stores machine executable instructions that can be executed by processor 931. The processor 931 is configured to execute machine executable instructions to implement the encoding and decoding methods of embodiments 1-10 in the present disclosure.

Figure 9D:
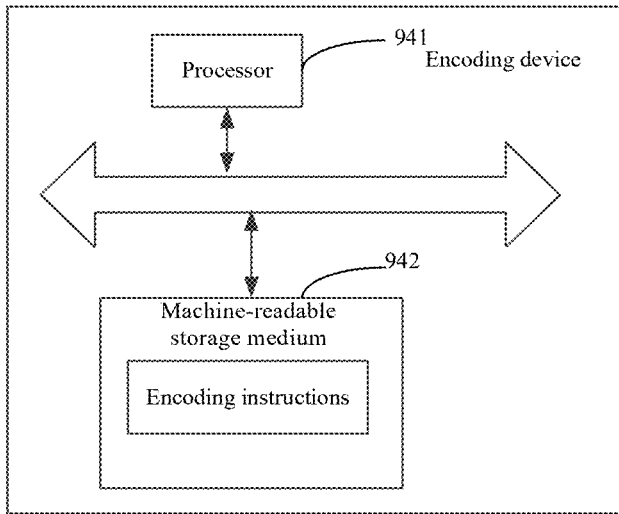
FIG. 9D is a hardware structure diagram of an encoding device according to an embodiment of the present disclosure.

Based on the same application concept as the above method, the encoding device (also known as a video encoder) provided in the embodiments of the present disclosure, from a hardware perspective, can be illustrated in FIG. 9D. The hardware architecture schematic includes processor 941 and machine-readable storage medium 942, where machine-readable storage medium 942 stores machine executable instructions that can be executed by processor 941. The processor 941 is configured to execute machine executable instructions to implement the encoding and decoding methods of embodiments 1-10 in the present disclosure.

Based on the same application concept as the above methods, the embodiments of the present disclosure further provide a machine-readable storage medium, which stores several computer instructions. When the computer instructions are executed by a processor, the methods in the embodiments of the present disclosure can be implemented, such as the decoding or encoding methods in the above embodiments.

Based on the same application concept as the above methods, the embodiments of the present disclosure further provide a computer application program that, when executed by a processor, the decoding or encoding methods in the embodiments of the present disclosure are implemented.

Based on the same application concept as the above method, the embodiments of the present disclosure further propose an encoding and decoding apparatus, which is applied to the decoding device or encoding device. The apparatus includes: a processing module, configured to, when a reference pixel of a current block is not available, remove a target prediction mode from an initial prediction mode list corresponding to the current block to obtain a target prediction mode list; and an encoding or decoding module, configured to encode or decode the current block based on the target prediction mode list.

For example, the initial prediction mode list includes multiple prediction modes, and the target prediction mode is a prediction mode in the initial prediction mode list that the current block will not use when the reference pixel is not available.

For example, when removing the target prediction mode from the initial prediction mode list corresponding to the current block, the processing module is configured to implement: determining multiple candidate prediction modes in the initial prediction mode list, where the candidate prediction mode is a prediction mode in the initial prediction mode list that is not used for the current block when the reference pixel is not available; selecting at least one prediction mode from all candidate prediction modes as the first target prediction mode; and removing the first target prediction mode from the initial prediction mode list.

For example, when selecting at least one prediction mode from all candidate prediction modes as the first target prediction mode, the processing module is configured to implement: based on the length of the codeword corresponding to each candidate prediction mode, selecting K candidate prediction modes from all candidate prediction modes as the on a retained prediction modes, where K is a positive integer; and determining a candidate prediction mode other than the retained prediction mode as the first target prediction mode.

For example, K is 1, and the retained prediction mode is the candidate prediction mode with the smallest codeword length.

For example, when removing the target prediction mode from the initial prediction mode list corresponding to the current block, the processing module is configured to implement; determining a second target prediction mode in the initial prediction mode list, where the second target prediction mode in the initial prediction mode list is a prediction mode that the current block will not use when the reference pixel is not available; and removing the second target prediction mode from the initial prediction mode list.

For example, the candidate prediction modes include multiple of the following; DC prediction mode, DIAG0 prediction mode, DIAG1 prediction mode, DIAG2 prediction mode, DIAG3 prediction mode, VER prediction mode, HOR prediction mode, IBM0 prediction mode, IBM1 prediction mode, and IBM2 prediction mode; and the first target prediction modes include at least one of: DC prediction mode, DIAG0 prediction mode, DIAG1 prediction mode, DIAG2 prediction mode, DIAG3 prediction mode, VER prediction mode, HOR prediction mode, IBM0 prediction mode, IBM1 prediction mode, and IBM2 prediction mode.

For example, when the reference pixel(s) at the upper boundary of the current block is not available, the candidate prediction modes include DC prediction mode, DIAG0 prediction mode, DIAG1 prediction mode, DIAG2 prediction mode, DIAG3 prediction mode, and VER prediction mode; and the first target prediction modes include: DIAG0 prediction mode, DIAG1 prediction mode, DIAG2 prediction mode, DIAG3 prediction mode, and VER prediction mode.

For example, when the reference pixel(s) at the left boundary of the current block is not available, the candidate prediction modes include: HOR prediction mode, IBM0 prediction mode, IBM1 prediction mode, and IBM2 prediction mode; and the first target prediction modes include IBM0 prediction mode, IBM1 prediction mode, and IBM2 prediction mode.

For example, when the reference pixel(s) at the upper boundary of the current block is not available and the reference pixel(s) at the left boundary of the current block is not available, the candidate prediction modes include: DC prediction mode, DIAG0 prediction mode, DIAG1 prediction mode, DIAG2 prediction mode, DIAG3 prediction mode, VER prediction mode, HOR prediction mode, IBM0 prediction mode, IBM1 prediction mode, and IBM2 prediction mode; and the first target prediction modes include: DIAG0 prediction mode, DIAG1 prediction mode, DIAG2 prediction mode, DIAG3 prediction mode, VER prediction mode, HOR prediction mode, IBM0 prediction mode, IBM1 prediction mode, and IBM2 prediction mode.

Based on the same application concept as the above method, the embodiments of the present disclosure further propose an encoding and decoding apparatus, which is applied to the decoding device or encoding device. The apparatus includes: a processing module, configured to, when a reference pixel at a first boundary of a current block is not available and a reference pixel at a second boundary of the current block is available, fill the reference pixel at the first boundary based on the reference pixel at the second boundary; and an encoding and decoding module, configured to encode or decode the current block based on the filled reference pixel at the first boundary and the filled reference pixel at the second boundary. For example, the first boundary is the left boundary, and the second boundary is the upper boundary; or the first boundary is the upper boundary, and the second boundary is the left boundary.

For example, when the reference pixels at the first boundary of the current block are not available and the reference pixels at the second boundary of the current block are available, when the reference pixels at the first boundary are filled based on the reference pixels at the second boundary, the processing module is configured to; when the prediction mode corresponding to the current block is a point-by-point prediction mode, the reference pixels at the upper boundary of the current block are not available, and the reference pixels at the left boundary of the current block are available, fill the reference pixels at the upper boundary with the first value of the reference pixels at the left boundary; and when the reference pixels at the left boundary of the current block are not available and the reference pixels at the upper boundary of the current block are available, fill the reference pixels at the left boundary with the first value of the reference pixels at the upper boundary. Alternatively, when the prediction mode corresponding to the current block is a point-by-point prediction mode and the reference pixels at the upper boundary are not available, and the reference pixels at the left boundary are available, the reference pixels at the upper boundary are filled with the reconstruction values of the prediction positions corresponding to the first row of the encoding block at the left boundary. When the reference pixels at the left boundary are not available and the reference pixels at the upper boundary are available, all the reference pixels at the left boundary are filled with the first value of the reference pixels at the upper boundary. Alternatively, when the prediction mode corresponding to the current block is an intra prediction mode other than DC prediction mode, and the reference pixels of the upper boundary of the current block are not available and the reference pixels of the left boundary of the current block are available, the reference pixels of the upper boundary are filled with the reconstruction values of corresponding prediction positions of the first row of the encoding block of the left boundary; when the reference pixel at the left boundary of the current block is not available and the reference pixel outside the upper boundary of the current block is available, the reference pixels at the left boundary are filled with the reference pixel values of corresponding positions of the first row of the upper boundary. Alternatively, when the prediction mode corresponding to the current block is intra prediction mode, and the reference pixels of the upper boundary are not available and the reference pixels of the left boundary are available, the reference pixels of the upper boundary are filled with the reconstruction values of the corresponding prediction positions of the first row of the encoding block of the left boundary; when the reference pixels at the left boundary are not available and the reference pixels at the upper boundary are available, the reference pixels at the left boundary are filled with default values.

Based on the same application concept as the above method, the embodiments of the present disclosure further propose an encoding and decoding apparatus, which is applied to the decoding device or encoding device. When an intra block copy prediction mode is enabled for a current block, the apparatus include: a first processing module, configured to, when a reference pixel at a left boundary of the current block is not available, and a reference pixel at an upper boundary of the current block is available, determine a first search region corresponding to a first sub block of the current block based on a reconstructed pixel outside the upper boundary, and determining a reconstructed pixel of the first sub block based on a reference pixel of the first search region; a second processing module, configured to, after obtaining the reconstructed pixel of the first sub block, determine a second search region corresponding to a second sub block of the current block based on a reconstructed pixel outside the upper boundary; and a second determining module, configured to determine a reconstructed pixel of the second sub block based on a reference pixel of the second search region; where the current block includes the first sub block and the second sub block.

For example, when determining the reconstructed pixels of the first sub block based on the reference pixels of the first search region, the first determining module is configured to: split the first sub block into M first prediction blocks, where M is a positive integer, and determine the reconstructed pixels of each first prediction block based on the reference pixels of the first search region. When determining the reconstructed pixels of the second sub block based on the reference pixels of the second search region, the second determination module is configured to split the second sub block into N second prediction blocks, where N is a positive integer, and determine the reconstructed pixels of each second prediction block based on the reference pixels of the second search region.

For example, the size of the second prediction block may be the same as the size of the first prediction block; Alternatively, the size of the second prediction block may be different from the size of the first prediction block. For example, if the size of the current block is 16*2, the sizes of both the first and second sub block are 8*2, then; the size of the first prediction block is 2*1, and the size of the second prediction block is 2*1 or 2*2; or the size of the first prediction block is 4*1, and the size of the second prediction block is 4*1 or 4*2; or the size of the first prediction block is 8*1, and the size of the second prediction block is 8*1 or 8*2.

For example, when the prediction mode corresponding to the current block is a point-by-point prediction mode, the reference pixels at the upper boundary of the current block are not available, and the reference pixels at the left boundary of the current block are available, the reference pixels of the upper boundary can be filled with the reconstruction values of corresponding prediction positions of the first row of the encoding block at the left boundary; in addition, when the reference pixels at the left boundary of the current block are not available and the reference pixels at the upper boundary of the current block are available, the reference pixels at the left boundary can be filled with the first value of the reference pixels at the upper boundary.

For example, when determining the first search region corresponding to the first sub block of the current block based on the reconstructed pixel outside the upper boundary, the first processing module is configured to; determine the reconstructed pixel outside the upper boundary as the first search region corresponding to the first sub block.

For example, when determining the second search region corresponding to the second sub block of the current block based on the reconstructed pixels of the upper boundary and/or the reconstructed pixels of the first sub block, the second processing module is configured to; fill the complete region of the second designated region on the left side of the second sub block based on the reconstructed pixels of the first row of the upper boundary and the reconstructed pixels of the first sub block, and determine the complete region of the second designated region as the second search region; or based on the reconstructed pixels of the first row of the upper boundary and the reconstructed pixels of the first sub block, fill a partial region of the second designated region on the left side of the second sub block, and determine the partial region of the second designated region as the second search region.

For example, when determining the second search region corresponding to the second sub block of the current block based on the reconstructed pixels of the upper boundary and/or the reconstructed pixels of the first sub block, the second processing module is configured to: determine the reconstructed pixels of the upper boundary as the second search region corresponding to the second sub block; or determine the reconstructed pixels of the first sub block as the second search region corresponding to the second sub block.

The reconstructed pixels of the upper boundary include: reconstructed pixels of the first row of the upper boundary; or the reconstructed pixels in the first row of the upper boundary and the reconstructed pixels in the second row of the upper boundary; where the length of the reconstructed pixels at the upper boundary can be equal to the width of the current block; or the length of the reconstructed pixels at the upper boundary can be greater than the width of the current block.

Based on the same application concept as the above method, the embodiments of the present disclosure further propose a decoding apparatus, which is applied to the decoding device. The apparatus includes; a decoding module, configured to implement decoding a fixed length code corresponding to each sub block within a current block from a bitstream corresponding to the current block; for each sub block within the current block, based on the fixed length code corresponding to the sub block, decoding a residual value corresponding to each position within the sub block from the bitstream corresponding to the current block; determining whether to decode a sign bit corresponding to the sub block based on a value of the fixed length code corresponding to the sub block; in response to determining to decode the sign bit corresponding to the sub block, decoding the sign bit corresponding to the sub block from the bitstream corresponding to the current block; and a determining module, configured to implement, when a residual value corresponding to a target position within the sub block is a residual boundary value, determining a sign of the residual boundary value based on the sign bit, where the target position is any one position within the sub block.

For example, when determining whether to decode the sign bit corresponding to the sub block based on the value of the fixed length code corresponding to the sub block, the decoding module is configured to implement; if the value of the fixed length code corresponding to the sub block is less than or equal to the target value K, determining to decode the sign bit corresponding to the sub block; otherwise, determining not to decode the sign bit corresponding to the sub block.

For example, the target value K can be a fixed value agreed upon by the decoding and encoding devices; or the target value K can be the value parsed by the decoding device from the picture header; or the target value K can be a value derived based on the picture bit width; or the target value K can be a value derived based on the QP parameter. For example, when decoding the fixed length code corresponding to each sub block in the current block from the bitstream corresponding to the current block, the decoding module is configured to implement; for a first sub block, decoding the fixed length code corresponding to the sub block from the bitstream; and for a sub block that is not the first sub block, decoding the first indication information corresponding to the sub block from the bitstream, where the first indication information can be used to indicate whether the fixed length code corresponding to this sub block is the same as the fixed length code corresponding to a previous sub block of this sub block; if the first indication information indicates that the fixed length code corresponding to this sub block is the same as the fixed length code corresponding to a previous sub block of this sub block, determining the fixed length code corresponding to the sub block based on the fixed length code corresponding to the previous sub block of the sub block; if the first indication information indicates that the fixed length code corresponding to this sub block is different from the fixed length code corresponding to a previous sub block of this sub block, decoding the fixed length code corresponding to the sub block from the bitstream.

For example, when decoding the fixed length code corresponding to each sub block in the current block from the bitstream corresponding to the current block, the decoding module is configured to implement; decoding the second indication information corresponding to the current block from the bitstream, where the second indication information is configured to indicate whether the sub block belongs to the same merging group as the previous sub block of the sub block; where the fixed length code corresponding to each sub block within the same merging group is the same, and the fixed length codes corresponding to sub blocks in different merging groups are different; and for the first sub block, decoding the fixed length code corresponding to the first sub block from the bitstream; and for a sub block that is not the first sub block, if the second indication information indicates that the sub block belongs to the same merge group as the previous sub block of the sub block, determining the fixed length code corresponding to the sub block based on the fixed length code of the previous sub block; if the second indication information indicates that the sub block and the previous sub block belong to different merging groups, decoding the to-be-adjusted fixed length code corresponding to the sub block from the bitstream, and adjusting the to-be-adjusted fixed length code based on the fixed length code corresponding to the previous sub block, to obtain the final fixed length code corresponding to the sub block.

The above description is only embodiments of the present disclosure and is not intended to limit the present disclosure. For those skilled in the art, various modifications and changes may be made in the present disclosure. Any modification, equivalent replacement, improvement, etc, present the spirit and principle of the present disclosure shall be included in the scope of the claims of the present disclosure.

The invention claimed is:

1. A decoding method, performed by a decoding device, wherein when an intra block copy prediction mode is enabled for a current block, the method comprises:

when reference pixels outside a left boundary of the current block are not available, and reference pixels outside an upper boundary of the current block are available, determining a first search region corresponding to a first sub block of the current block based on reconstructed pixels outside the upper boundary, and determining reconstructed pixels of the first sub block based on reference pixels of the first search region; and after obtaining the reconstructed pixels of the first sub block, determining a second search region corresponding to a second sub block of the current block based on reconstructed pixels outside the upper boundary, and determining reconstructed pixels of the second sub block based on reference pixels of the second search region;

wherein the current block comprises the first sub block and the second sub block.

2. The method according to claim 1, wherein determining the first search region corresponding to the first sub block of the current block based on the reconstructed pixels outside the upper boundary comprises: determining the reconstructed pixels outside the upper boundary as the first search region corresponding to the first sub block; and determining the second search region corresponding to the second sub block of the current block based on the reconstructed pixels outside the upper boundary comprises: determining the reconstructed pixels outside the upper boundary as the second search region corresponding to the second sub block.

3. The method according to claim 1, wherein the first sub block comprises at least one first prediction block; wherein when the reference pixels outside the left boundary of the current block are not available, and the reference pixels outside the upper boundary of the current block are available, determining the first search region corresponding to the first sub block of the current block based on the reconstructed pixels outside the upper boundary, and determining the reconstructed pixels of the first sub block based on the reference pixels of the first search region comprises:

when the reference pixels outside the left boundary of the current block are not available and the reference pixels outside the upper boundary of the current block are available, determining the first search region corresponding to the first sub block of the current block based on the reconstructed pixels outside the upper boundary, and determining reconstructed pixels of each of the at least one first prediction block in the first sub block based on reference pixels of the first search region.

4. The method according to claim 3, wherein the second sub block comprises at least one second prediction block; wherein after obtaining the reconstructed pixels of the first sub block, determining the second search region corresponding to the second sub block of the current block based on the reconstructed pixels outside the upper boundary, and determining the reconstructed pixels of the second sub block based on the reference pixels of the second search region comprises:

after obtaining the reconstructed pixels of the first sub block, determining the second search region corresponding to the second sub block of the current block based on the reconstructed pixels outside the upper boundary and/or the reconstructed pixels of the first sub block, and determining reconstructed pixels of each of the at least one second prediction block of the second sub block based on reference pixels of the second search region.

5. The method according to claim 3, wherein determining the reconstructed pixels of each of the at least one first prediction block in the first sub block based on the reference pixels of the first search region comprises:

for each of the at least one first prediction block, finding a reference block that matches the first prediction block from the first search region, wherein a size of the reference block is same as a size of the first prediction block; and determining the reconstructed pixels of the first prediction block based on the reference block.

6. The method according to claim 3, wherein when a size of the current block is 16*2 and a size of the first sub block is 8*2, a size of one of the at least one first prediction block is 4*1.

7. The method according to claim 4, wherein determining the reconstructed pixels of each of the at least one second prediction block in the second sub block based on the reference pixels of the second search region comprises:

for each of the at least one second prediction block, finding a reference block that matches the second prediction block from the second search region, wherein a size of the reference block is same as a size of the second prediction block; and determining the reconstructed pixels of the second prediction block based on the reference block.

8. The method according to claim 4, wherein a size of the at least one second prediction block is same as a size of the at least one first prediction block; wherein when a size of the current block is 16*2 and sizes of the first sub block and the second sub block are 8*2, a size of each of the at least one first prediction block is 4*1, and a size of each of the at least one second prediction block is 4*1.

9. An encoding method, performed by an encoding device, wherein when an intra block copy prediction mode is enabled for a current block, the method comprises:

when reference pixels outside a left boundary of the current block are not available, and reference pixels outside an upper boundary of the current block are available, determining a first search region corresponding to a first sub block of the current block based on reconstructed pixels outside the upper boundary, and determining reconstructed pixels of the first sub block based on reference pixels of the first search region; and after obtaining the reconstructed pixels of the first sub block, determining a second search region corresponding to a second sub block of the current block based on reconstructed pixels outside the upper boundary, and determining reconstructed pixels of the second sub block based on reference pixels of the second search region;

wherein the current block comprises the first sub block and the second sub block.

10. A decoding device, comprising:

one or more memories configured to store video data; and a decoder configured to implement the method according to claim 1.

11. A decoding device, comprising: one or more processors and one or more machine-readable storage media, wherein the one or more machine-readable storage media store machine executable instructions that can be executed by the one or more processors; and the one or more processors are configured to execute the machine executable instructions to implement the method according to claim 1.

12. An encoding device comprising: one or more processors and one or more machine-readable storage media, wherein the one or more machine-readable storage media store machine executable instructions that can be executed by the one or more processors, and the one or more processors execute the machine executable instructions to implement the method claim 9.

13. A non-transitory machine-readable storage medium storing instructions that are executable by one or more processors, wherein when the one or more processors execute the instructions, the method according to claim 1 is implemented.

*     *     *     *     *